(12) United States Patent
Goradia et al.

(10) Patent No.: US 12,382,219 B1
(45) Date of Patent: Aug. 5, 2025

(54) SYSTEMS AND METHODS FOR CONFIGURING DUPLEXING WITHIN A DOORBELL CAMERA

(71) Applicant: SimpliSafe, Inc., Boston, MA (US)

(72) Inventors: Kunal Goradia, Andover, MA (US); Philip Lentini, Andover, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/950,472

(22) Filed: Nov. 18, 2024

Related U.S. Application Data

(60) Provisional application No. 63/702,303, filed on Oct. 2, 2024.

(51) Int. Cl.
*H04R 3/00* (2006.01)
(52) U.S. Cl.
CPC ............................ *H04R 3/00* (2013.01)
(58) Field of Classification Search
CPC ................................. H04R 3/00; H04R 3/005
USPC ....... 381/111–115, 122, 123, 91, 92, 95, 163
See application file for complete search history.

(56) References Cited

U.S. PATENT DOCUMENTS

| | | | | |
|---|---|---|---|---|
| 7,415,282 | B2 * | 8/2008 | Tillet | H04W 76/20 455/552.1 |
| 7,818,036 | B2 * | 10/2010 | Lair | H04B 5/72 381/74 |
| 2003/0118201 | A1 * | 6/2003 | Leske | H04R 3/00 381/117 |
| 2005/0232442 | A1 * | 10/2005 | Seknicka | H04R 3/00 381/92 |
| 2014/0254823 | A1 * | 9/2014 | Yan | H03G 3/002 381/92 |
| 2014/0270248 | A1 * | 9/2014 | Ivanov | H04M 1/605 381/92 |
| 2014/0321664 | A1 * | 10/2014 | Huang | H04R 29/005 381/92 |
| 2016/0134966 | A1 * | 5/2016 | Fitzgerald | H04R 3/005 381/123 |
| 2018/0063661 | A1 * | 3/2018 | Hartwell | H04R 3/00 |
| 2021/0385575 | A1 * | 12/2021 | Meiyappan | H04R 5/027 |

FOREIGN PATENT DOCUMENTS

EP           2961140 A1 * 12/2015 ............. H04B 1/406

OTHER PUBLICATIONS

Delaney, "SimpliSafe Video Doorbell Pro Review", PCMag, download from <https://www.pcmag.com/reviews/simplisafe-video-doorbell-pro> (Mar. 19, 2024).
Fraze, "Ring Video Doorbell Review", SafeHome. org, download from <https://www.safehome.org/doorbell-cameras/ring/reviews/> (Aug. 8, 2024).

* cited by examiner

*Primary Examiner* — Xu Mei
(74) *Attorney, Agent, or Firm* — Finch & Maloney PLLC

(57) ABSTRACT

A method includes operating, by a device, a microphone incorporated in the device in a half-duplex mode; receiving, by the device, a message to initiate a session with another device, the message including a parameter; parsing, by the device, the message to identify a mode of operation of the microphone based on the parameter; and adjusting, by the device, the microphone to operate in a full-duplex mode based on identification of the mode of operation.

20 Claims, 14 Drawing Sheets

SYSTEMS AND METHODS FOR CONFIGURING DUPLEXING WITHIN A DOORBELL CAMERA

CROSS-REFERENCE TO RELATED APPLICATION

This application claims, under 35 U.S.C. § 119(e), benefit of and priority to U.S. Provisional Patent Application No. 63/702,303 filed on Oct. 2, 2024 and titled "SYSTEMS AND METHODS FOR CONFIGURING DUPLEXING WITHIN A DOORBELL CAMERA," which is hereby incorporated herein by reference in its entirety for all purposes.

TECHNICAL FIELD

Aspects of the technologies described herein relate to security systems and methods.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

This disclosure is directed to techniques for operating, by a device that includes a microphone, the microphone in a half-duplex mode; receiving, by the device, a message to initiate a session with another device, the message including a parameter; parsing, by the device, the message to identify a mode of operation of the microphone based on the parameter; and adjusting, by the device, the microphone to operate in a full-duplex mode based on the mode of operation identified based on the parameter.

The method can incorporate one or more of the following features.

The method may further include receiving audio from the other device, wherein operating the microphone in the half-duplex mode includes inactivating the microphone prior to rendering the audio via a speaker incorporated in the device. In the method, operating the microphone in the half-duplex mode may include activating the microphone after a threshold period of time has elapsed since the audio was received from the other device. Receiving the message to initiate the session may include receiving a parameter indicating an agency interface generated the message. Operating the microphone in the full-duplex mode may include activating the microphone prior to rendering audio via a speaker incorporated in the device.

The method may further include receiving audio from the other device; rendering the audio via the speaker; and capturing the audio via the microphone. The method may further include communicating, by the device to the other device, the audio captured by the microphone. The method may further include communicating, by the device to the other device, image data captured by an image sensor incorporated in the device. In the method, communicating the image data may include communicating the image data from a camera.

Other examples include systems and computer executable instructions (e.g., code) configured to execute the methods described herein.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

DETAILED DESCRIPTION

Figure 1:
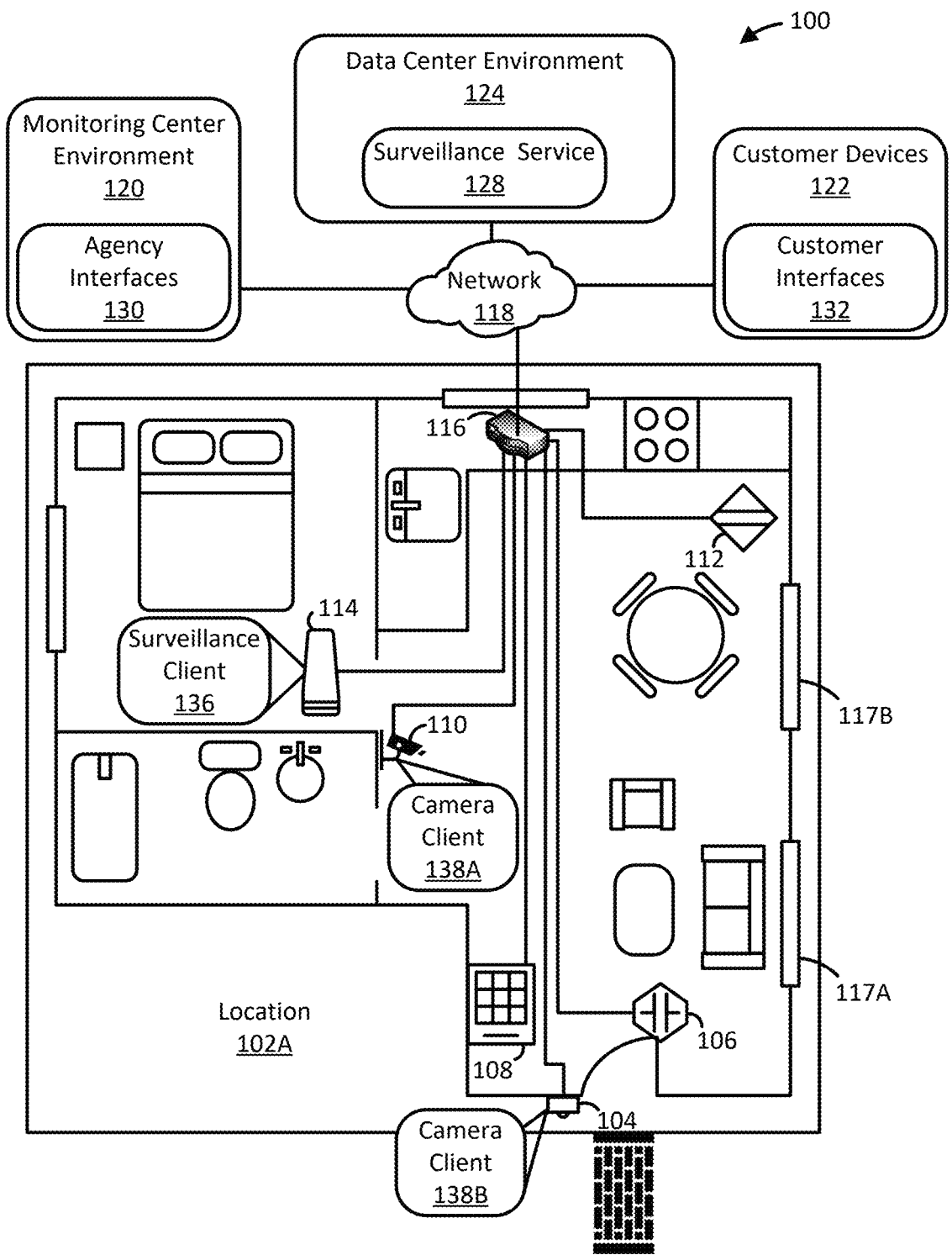
FIG. 1 is a schematic diagram of a security system, according to some examples described herein.

As summarized above, at least some examples disclosed herein are directed to communication sessions in which a source device, which initiates a session, interoperates with a target device, which receives an invitation to join the session. In these examples, systems and processes are described that enable multiple source devices with varying technological capabilities to exchange audio data in a preferred mode with an installed population of target devices also having various technological capabilities. In certain examples, the source devices may be divided into two cohorts. The first cohort may include devices with user interfaces that are robust relative to the user interfaces of the target devices but that lack more specialized functions, such as an ability to filter echoes present in audio received from a target device. Examples of devices that belong to the first cohort may include smartphones, tablets, and some laptop computers. The second cohort may include devices with an ability to filter echoes present in audio received from a target device.

Examples of devices that belong to the second cohort include computing devices with echo cancellation software or hardware installed therein, certain types of headphones with echo cancellation, and the like. Further, in some examples, the installed population of target devices may include security devices with user interfaces that are limited relative to the source devices and that may or may not be capable of operating in a full-duplex mode in which both a microphone and a speaker of the target device may be active at the same time.

In some examples, the technology described herein enables the first cohort of computing devices to initiate half-duplex communication sessions with individual security devices within the installed population. Within these half-duplex sessions, echoes are prevented through control of the microphones present within the source devices and the microphone present within the target devices. In some examples, control of the microphones is based on a user interface implemented by the source device via their robust user interfaces. In these examples, the technological limitations of the user interfaces of the target devices is overcome by limiting the interaction required between a user and a target device.

In some examples, the technology described herein enables the second cohort of computing devices to initiate full-duplex communication sessions with individual security devices within the installed population—provided that the individual security devices are capable of full-duplex operation. Within these full-duplex sessions, echoes are prevented through echo cancellation implemented by the source devices. In these examples, the express transition between sending and receiving modes present in half-duplex operation is eliminated, thereby allowing for smoother operation of the source and target device and a less technologically complex user interface.

The systems and methods described herein solve other technological problems. For instance, in some examples, devices belonging to the second cohort autonomously determine whether a target device is capable of full-duplex operation and, based on that determination, interoperate with the overall system to configure the target device for either half-duplex operation or, preferably, full-duplex operation, depending on the capabilities of the target device. However, should devices belonging to the first cohort initiate a session with the same target device, the overall system can autonomously reconfigure the target device to operate in a half-duplex mode. This feature allows source devices to seamlessly interoperate with target devices using a preferred operational mode. Other advantages will be apparent in view of this disclosure.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes a monitored location 102A, a monitoring center environment 120, a data center environment 124, one or more customer devices 122, and a communication network 118. Each of the monitored location 102A, the monitoring center environment 120, the data center environment 124, the one or more customer devices 122, and the communication network 118 include one or more computing devices (e.g., as described below with reference to FIG. 10). The one or more customer devices 122 are configured to host one or more customer interface applications 132. The monitoring center environment 120 is configured to host one or more agency interface applications 130. The data center environment 124 is configured to host a surveillance service 128. The location 102A includes image capture devices 104 and 110, a contact sensor assembly 106, a keypad 108, a motion sensor assembly 112, a base station 114, and a router 116. The base station 114 hosts a surveillance client 136. The image capture devices 104 and 110 host individual instances of a camera client 138 (shown as camera client 138B and 138A). The security devices disposed at the location 102A (e.g., devices 104, 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the location 102A by way of example only. Other networking technology that involves other computing devices is suitable for use within the location 102A. For instance, in some examples, the base station 114 can receive and forward communication packets transmitted by the image capture devices 104 and 110 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, etc. Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the location 102A support other communication protocols, such as MQTT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the agency interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g., via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the agency interfaces 130, and/or the customer interfaces 132, although the pixel resolution and frame rate may vary depending on the capabilities of the devices. Where the image capture devices 104 and 110 have sufficient processing capacity and available power, the image capture devices 104 and 110 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 100 (e.g., via the router 116). As shown in FIG. 1, the image capture device 104 has a field of view (FOV) that originates proximal to a front door of the location 102A and can acquire images of a walkway, highway, and a space between the location 102A and the highway. In some examples, the image capture device 104 may further include a speaker and a microphone. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture devices 104 and 110 are configured to communicate with the surveillance service 128, the agency interfaces 130, and the customer interfaces 132 separately from the surveillance client 136 via execution of the camera clients 138. These communications can include sensor data generated by the image capture devices 104 and 110 and/or commands to be executed by the image capture devices 104 and 110 sent by the surveillance service 128, the agency interfaces 130, and/or the customer interfaces 132. The commands can include, for example, requests for interactive communication sessions in which monitoring personnel and/or customers interact with the image capture devices 104 and 110 via the agency interfaces 130 and the customer interfaces 132. These interactions can include requests for the image capture devices 104 and 110 to transmit additional sensor data and/or requests for the image capture devices 104 and 110 to render output via a user interface (e.g., the user interface 412 of FIGS. 4B-4D). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate sensor data indicating whether the front door of the location 102A is open or closed to the base station 114. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alarm state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the agency interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to the surveillance service 128 when a communication link to the surveillance service 128 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108 or the customer interface application 132, reception of commands from one of the agency interfaces 130 or the customer interfaces 132 via the network 118, or detection of the occurrence of a scheduled event. The programmatic operations executed by the base station 114 under control of the surveillance client 136 can include activation or deactivation of one or more of the location-based devices; sounding of an alarm; and reporting an event or location data to the surveillance service 128; to name a few operations. The location data can include data specifying sensor readings (sensor data), configuration data of any of the location-based devices, commands received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the surveillance service 128 is configured to control overall logical setup and operation of the system 100. As such, the surveillance service 128 can interoperate with the agency interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the agency interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed.

In some examples, the surveillance service 128 is configured to securely, reliably, and efficiently exchange messages between processes implemented by the location-based devices and processes implemented by other devices in the system 100. These other devices can include the customer devices 122 that implement the customer interfaces 132, devices disposed in the data center environment 124, and/or devices disposed in the monitoring center environment 120 that implement the agency interfaces 130. For instance, in some examples, the surveillance service 128 incorporates, or is configured to interoperate with, an identity provider. In these examples, the surveillance service 128 is configured to receive authentication requests from the surveillance clients 136 or the camera clients 138 that include security credentials. When the surveillance service 128 can authenticate the security credentials in a request (e.g., via a validation function, cross-reference look-up, or some other authentication process), the surveillance service 128 can communicate a security token in response to the request. A surveillance client 136 or a camera client 138 can then receive, store, and include the security token in subsequent ingress messages communicated from the surveillance client 136 or the camera client 138 to the surveillance service, so that the surveillance service 128 is able to securely process (e.g., unpack/parse) the ingress messages.

Continuing with the example of FIG. 1, the surveillance service 128 is configured to parse ingress messages from the location-based devices to extract payloads included therein and store the payloads and/or data derived from the payloads within one or more data stores hosted in the data center environment 124. The data stored in the payloads may include, for example, location data as described herein. The data housed in the data stores may be subsequently accessed by, for example, the surveillance service 128, the agency interfaces 130, and the customer interfaces 132. It should be noted that data stored within any of the data stores disclosed herein may be stored by value or by reference (e.g., via a pointer, address, or other identifier of the data or the data's location).

More specifically, in certain examples, the surveillance service 128 is configured to process ingress messages from the customer interface 132, the surveillance client 136, the camera clients 138, and/or the agency interfaces 130. In these examples, the surveillance service 128 is configured to receive the ingress messages, verify the authenticity of the messages, parse the messages, and extract the data (e.g., location data) encoded therein. In certain examples, the surveillance service 128 is configured to store, within a plurality of records, extracted data in association with identifiers of customers (e.g., user account identifiers) for whom a location is monitored. For example, the extracted data may be stored in a record with an identifier of a customer and/or an identifier of a location to associate the extracted data with the customer and the location. In certain examples, the surveillance service 128 is further configured to store, within a plurality of records, extracted sensor data (e.g., one or more frames of image data) separately from other extracted location data but in association with identifiers of locations and timestamps at which the sensor data was acquired. In some examples, separate storage of sensor data is optional and may be used, for example, where the sensor data housed therein has specialized storage or processing requirements.

In certain examples, to implement at least portions of the aspects described above, the surveillance service 128 exposes and implements one or more application programming interfaces (APIs) that are configured to receive, process, and respond to calls from processes hosted by the location-based devices described herein or other devices. In these examples, the surveillance service 128 may incorporate individual message handlers within the APIs that are configured to process ingress messages generated by location-based monitoring equipment of a particular manufacturer and/or model. For instance, message handlers within the surveillance service 128 can be associated with and specific to certain manufactures and models of location-based monitoring equipment (e.g., SIMPLISAFE equipment, RING equipment, etc.), although this is not a requirement. The processing executed by the message handlers may include parsing the ingress messages to extract data therefrom and storing the extracted data in a data store (e.g., a buffer). The message handlers may also be configured to generate egress messages responsive to the ingress messages and communicate the egress messages in response to API calls. The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the surveillance service 128. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the surveillance service 128 is not limited to a particular protocol or architectural style. It should be noted that, in at least some examples, the surveillance service 128 can transmit one or more API calls to location-based devices to request data from, or an interactive communication session with, the location-based devices.

Continuing with the example of FIG. 1, in some examples the surveillance service 128 is configured to process sensor data (e.g., images and/or sequences of images) to identify movement, human faces, and other features within the sensor data. In these examples, the surveillance service 128 may incorporate, or be configured to interoperate with, one or more artificial intelligence (AI) models or services trained to identify objects, object movement, humans, individual human faces, events, or other features from sensor data. The surveillance service 128 may also be configured to scan location data transported via the ingress messages for event data and, where event data is identified, execute one or more event handlers to process the event data. In some examples, the event handlers can include an event reporter that is configured to identify reportable events and to communicate egress messages specifying the reportable events to one or more recipient processes (e.g., a customer interface 132, an agency interface 130, a surveillance client 136, or a camera client 138). Further example processes that the surveillance service 128 is configured to execute are described below with reference to FIGS. 5-9B.

Continuing with the example of FIG. 1, individual agency interfaces 130 are configured to control computing device interaction with monitoring personnel and to execute a variety of programmatic operations in response to the interactions. For instance, in some examples, the agency interface 130 controls its host device to provide information regarding reportable events detected at monitored locations, such as the location 102A, to monitoring personnel. Such events can include, for example, movement or an alarm condition generated by one or more of the location-based devices. Alternatively or additionally, in some examples, the agency interface 130 controls its host device to interact with a user to configure features of the system 100. Further example processes that the agency interface 130 is configured to execute are described below with reference to FIGS. 6A, 7, 9A, and 9B. It should be noted that, in at least some examples, the agency interfaces 130 are browser-based applications served to the monitoring center environment 120 by webservers included within the data center environment 124. These webservers may be part of the surveillance service 128, in certain examples.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alarm condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIGS. 6B and 9B.

Figures 2, 3:
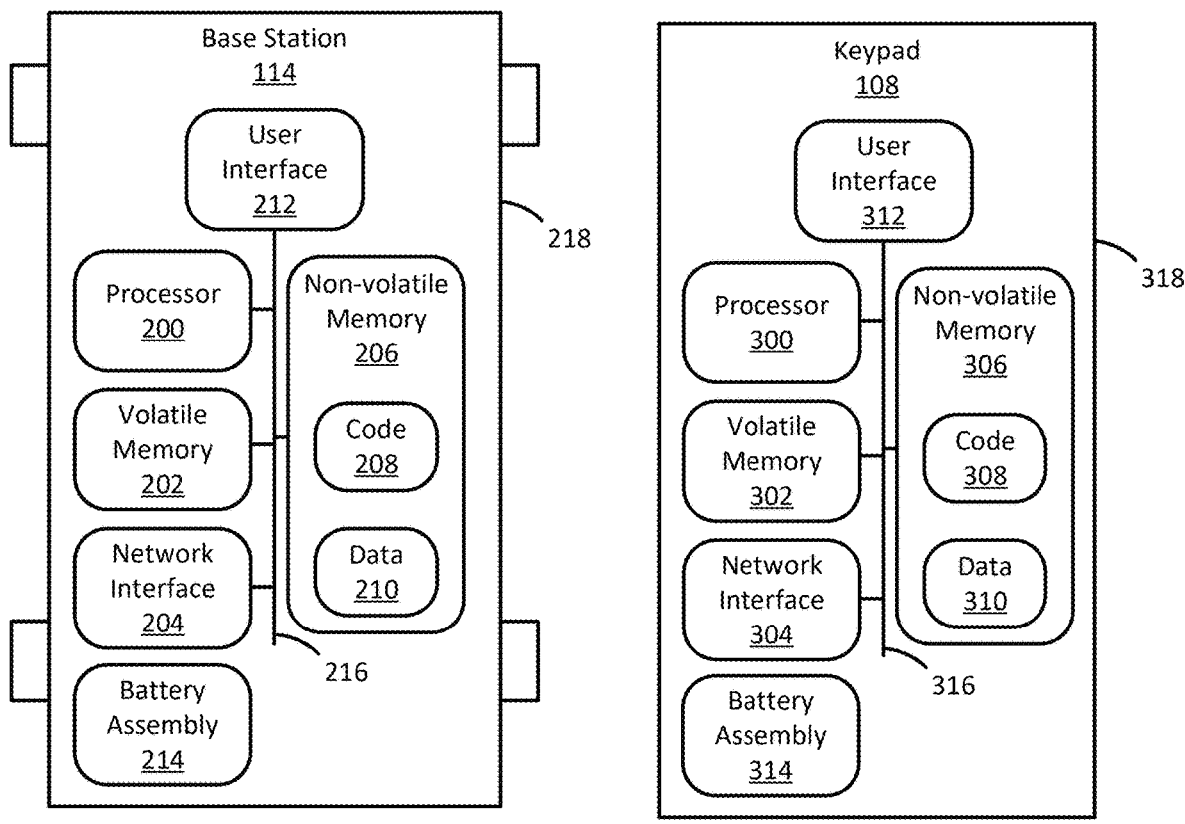
FIG. 2 is a schematic diagram of a base station, according to some examples described herein.
FIG. 3 is a schematic diagram of a keypad, according to some examples described herein.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing with the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g., memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol/internet protocol (TCP/IP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit messages to other location-based devices. These messages can include wake messages to request streams of sensor data, alarm messages to trigger alarm responses, or other messages to initiate other operations. Bands that the network interface 204 may utilize for sub-GHz wireless networking include, for example, an 868 MHz band and/or a 915 MHz band. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 dB siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP/IP, UDP, HTTP, and MQTT among others. As such, the network interface 304 enables the keypad 108 to access and communicate with other computing devices (e.g., the other location-based devices) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

In some examples, devices like the keypad 108, which rely on user input to trigger an alarm condition, may be included within a security system, such as the security system 100 of FIG. 1. Examples of such devices include dedicated key fobs and panic buttons. These dedicated security devices provide a user with a simple, direct way to trigger an alarm condition, which can be particularly helpful in times of duress.

Figure 4A:
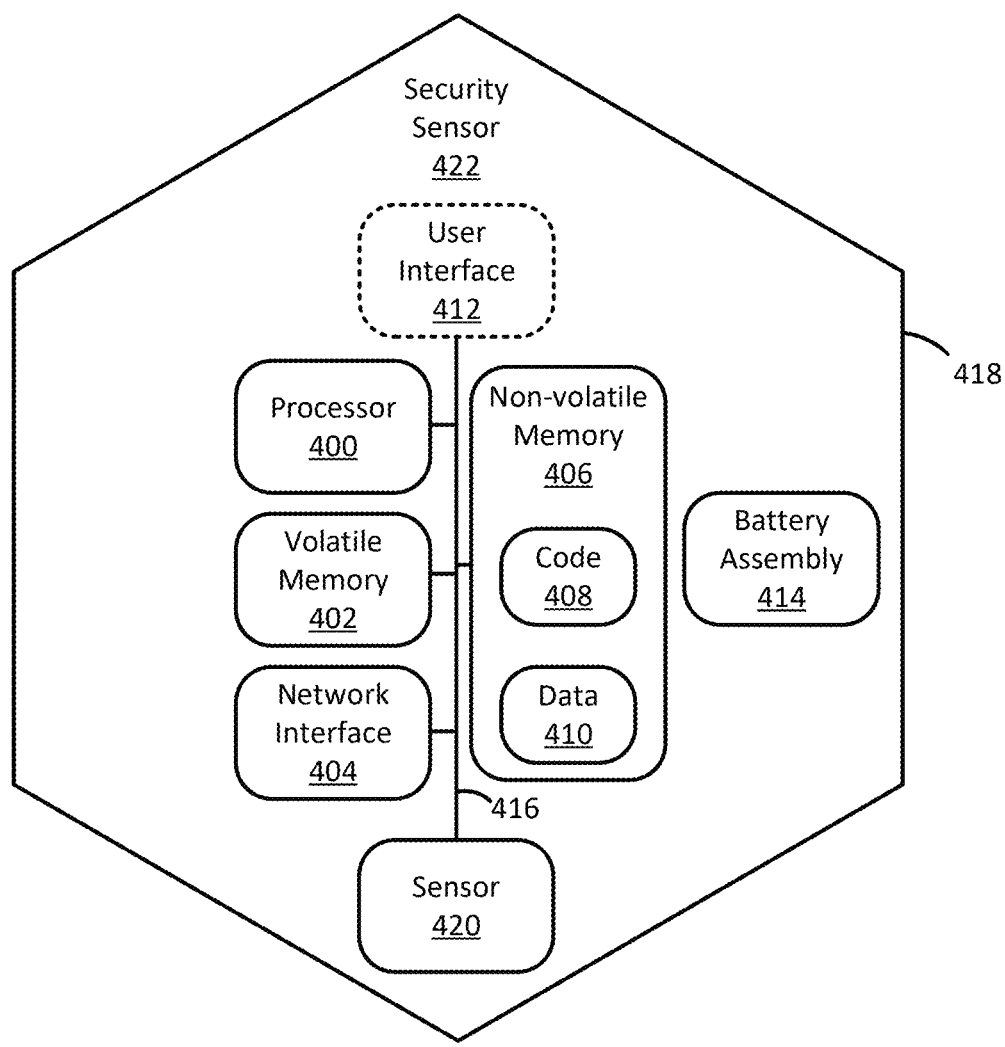
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. Other examples of security sensors 422 include glass break sensors, carbon monoxide sensors, smoke detectors, water sensors, temperature sensors, and door lock sensors, to name a few. As shown in FIG. 4A, the security sensor 422 includes at least one processor 400, volatile memory 402, non-volatile memory 406, at least one network interface 404, a battery assembly 414, an interconnection mechanism 416, and at least one sensor assembly 420. The non-volatile memory 406 stores executable code 408 and a data store 410. Some examples include a user interface 412. As indicated by its rendering in dashed lines, not all examples of the security sensor 422 include the user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP/IP, UDP, HTTP, and MQTT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and/or a temperature or thermographic sensor (e.g., an active and/or passive infrared (PIR) sensor). Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera client 138 of FIG. 1 and can result in manipulated data that is a part of the data store 410.

Figure 4B:
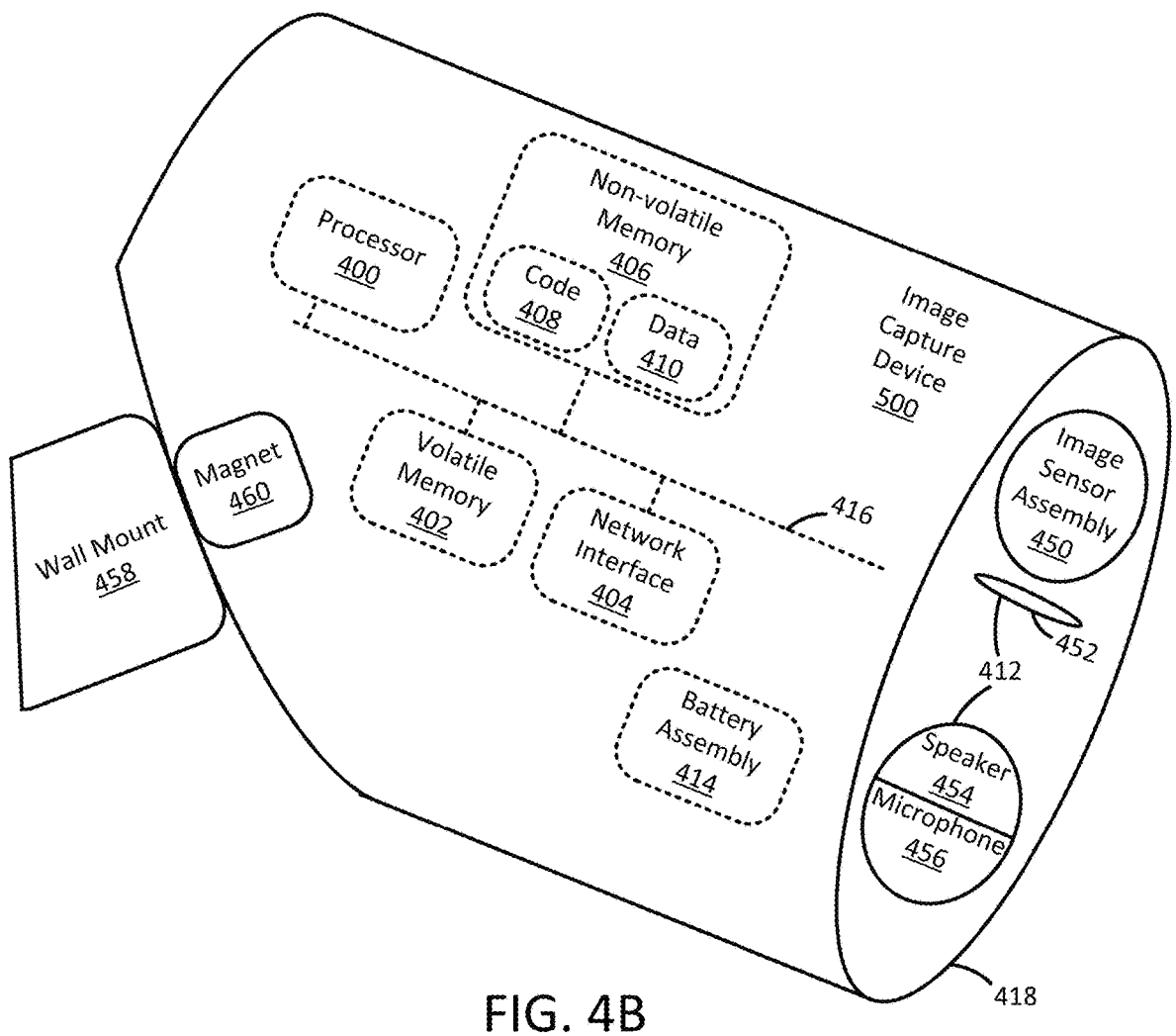
FIG. 4B is a schematic diagram of an image capture device, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device 500 are illustrated in dashed lines to indicate that they reside within a housing 418. The non-volatile memory 406 stores executable code 408 and a data store 410.

Some examples further include an image sensor assembly 450, a light 452, a speaker 454, a microphone 456, a wall mount 458, and a magnet 460. The image sensor assembly 450 may include a lens and an image sensor (e.g., a charge-coupled device or an active-pixel sensor) and/or a temperature or thermographic sensor (e.g., an active and/or passive infrared (PIR) sensor). The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 dB or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be streamed to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alarm via the siren) or streamed from the base station 114 (or one of the processes 130, 128, or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128, or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A. The image capture device 500 may be a battery-powered outdoor sensor configured to be installed and operated in an outdoor environment, such as outside a home, office, store, or other commercial or residential building, for example.

Figure 4C:
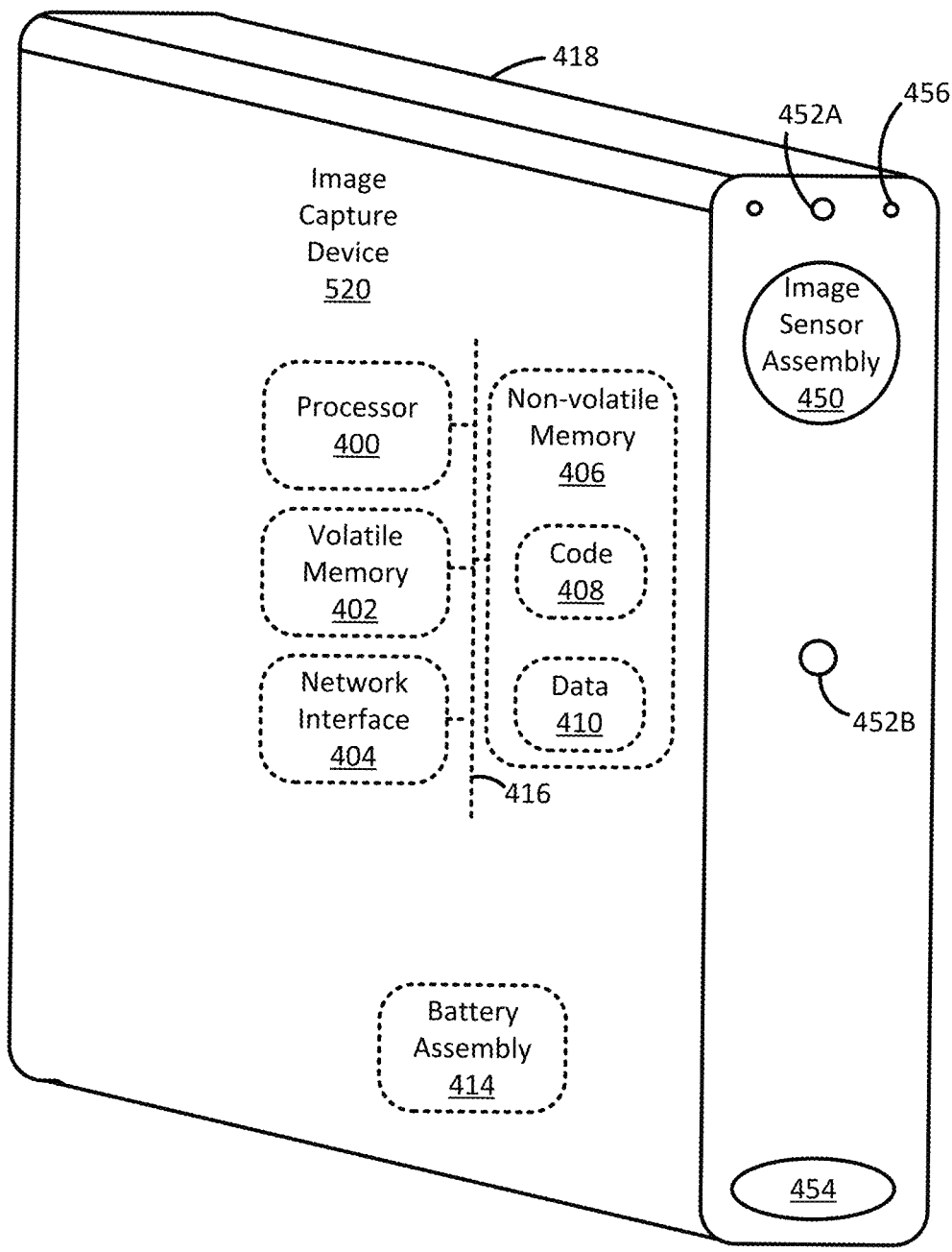
FIG. 4C is a schematic diagram of another image capture device, according to some examples described herein.

Turning now to FIG. 4C, another example image capture device 520 is schematically illustrated. Particular configurations of the image capture device 520 (e.g., the image capture devices 104 and 110) are illustrated in FIG. 1 and described above. As shown in FIG. 4C, the image capture device 520 includes at least one processor 400, volatile memory 402, non-volatile memory 406, at least one network interface 404, a battery assembly 414, and an interconnection mechanism 416. These features of the image capture device 520 are illustrated in dashed lines to indicate that they reside within a housing 418. The non-volatile memory 406 stores executable code 408 and a data store 410. The image capture device 520 further includes an image sensor assembly 450, a speaker 454, and a microphone 456 as described above with reference to the image capture device 500 of FIG. 4B.

In some examples, the image capture device 520 further includes lights 452A and 452B. The light 452A may include a light emitting diode (LED), such as a red-green-blue emitting LED. The light 452B may also include an infrared emitting diode to enable night vision in some examples.

It should be appreciated that in the example of FIG. 4C, the lights 452A and/or 452B, the speaker 454, and the microphone 456 implement an instance of the user interface 412 of FIG. 4A. It should also be appreciated that the image sensor assembly 450 and the lights 452A and/or 452B implement an instance of the sensor assembly 420 of FIG. 4A. As such, the image capture device 520 illustrated in FIG. 4C is at least one example of the security sensor 422 illustrated in FIG. 4A. The image capture device 520 may be a battery-powered indoor sensor configured to be installed and operated in an indoor environment, such as within a home, office, store, or other commercial or residential building, for example.

Figure 4D:
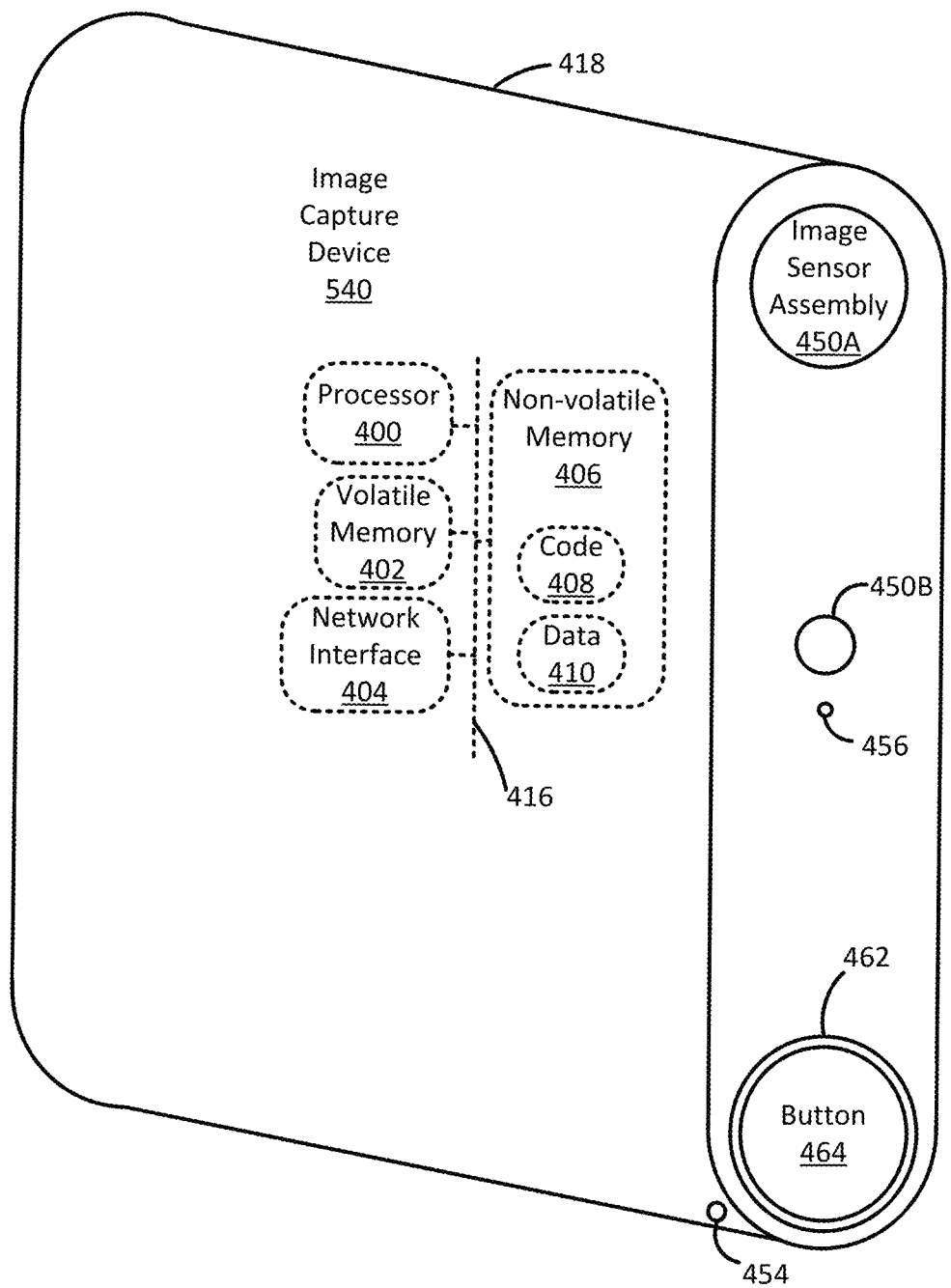
FIG. 4D is a schematic diagram of another image capture device, according to some examples described herein.

Turning now to FIG. 4D, another example image capture device 540 is schematically illustrated. Particular configurations of the image capture device 540 (e.g., the image capture devices 104) are illustrated in FIG. 1 and described above. As shown in FIG. 4D, the image capture device 540 includes at least one processor 400, volatile memory 402, non-volatile memory 406, at least one network interface 404, and an interconnection mechanism 416. These features of the image capture device 540 are illustrated in dashed lines to indicate that they reside within a housing 418. The non-volatile memory 406 stores executable code 408 and a data store 410. The image capture device 540 further includes a speaker 454 and a microphone 456 as described above with reference to the image capture device 500 of FIG. 4B.

Some examples further include an image sensor assembly 450A, a motion sensor assembly 450B, a light 462, and a button 464. The image sensor assembly 450A may include a lens and an image sensor (e.g., a charge-coupled device or an active-pixel sensor). The motion sensor assembly 450B may include a temperature or thermographic sensor (e.g., an active and/or passive infrared (PIR) sensor). The light 462 may include a light emitting diode (LED), such as a red-green-blue emitting LED, coupled with a transparent material formed in an annular shape. The button 464 may include a touch sensor (e.g., a pressure sensor, capacitive sensor, or the like) configured to detect a button press. In some examples, the processor 400 may be configured (e.g., via the code 408) to activate a doorbell or other sound emitter separate from, or incorporated within, the image capture device 540 upon detecting a press of the button 464. Additionally or alternatively, the button 464 may be movable from a first, default position to a second, actuated position when pressed. In these examples, when in an actuated position, the button closes or otherwise completes a circuit that drives the operation of a doorbell or other sound emitter.

It should be appreciated that in the example of FIG. 4D, the light 462, the button 464, the speaker 454, and the microphone 456 implement an instance of the user interface 412 of FIG. 4A. It should also be appreciated that the image sensor assembly 450 implements an instance of the sensor assembly 420 of FIG. 4A. As such, the image capture device 540 illustrated in FIG. 4D is at least one example of the security sensor 422 illustrated in FIG. 4A. The image capture device 540 may be a battery-powered or wired doorbell unit configured to be installed and operated in an outdoor environment, such as at the front door of a home, office, store, or other commercial or residential building, for example.

Figure 5:
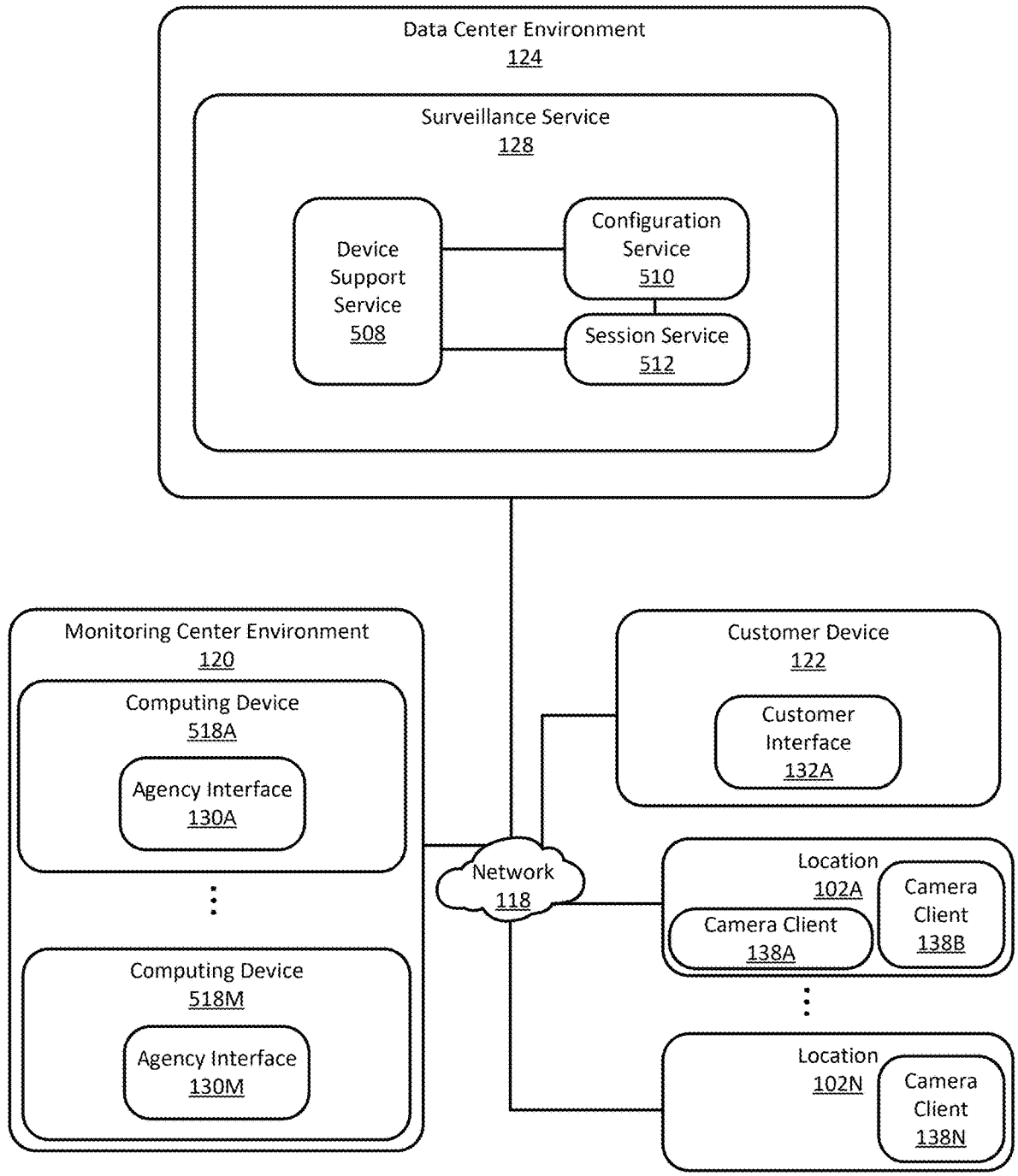
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A through 102N of FIG. 1 (collectively referred to as the locations 102) are schematically illustrated. As shown in FIG. 5, the data center environment 124 hosts the surveillance service 128. The surveillance service 128 includes a device support service 508, a configuration service 510, and a session service 512. The monitoring center environment 120 includes computing devices 518A through 518M (collectively referred to as the computing devices 518) that host agency interfaces 130A through 130M. In some examples, individual agency interfaces 130A-130M and the customer interface 132A are configured to render GUIs including one or more image frames and/or other sensor data. Individual locations 102A through 102N include image capture devices (e.g., the image capture device 104 and 110 of FIG. 1, not shown) that host the camera clients 138A through 138N (collectively referred to as the camera clients 138). The camera clients 138 are configured to generate and communicate, to the surveillance service 128 via the network 118, ingress messages that include packages of location data based on sensor information received at the locations 102.

As shown in FIG. 5, the customer interface 132A is configured to receive (e.g., via a user interface control) input from a user requesting that an interactive communication session be established between the customer device 122 and a location-based device (e.g., the image capture device 104 of FIG. 1 or the image capture device 110 of FIG. 1). In these examples, the customer interface 132A is configured to respond to such user input by communicating a request to initiate a session between the customer interface 132A and a camera client 138A hosted by the location-based device. For instance, in some examples, the customer interface 132A is configured to interoperate with the session service 512 via a session API exposed and implemented by the session service 512. In such examples, the customer interface 132A communicates, via a session API call, a session request message to the session service 512 that identifies the location-based device and requests initiation of the session. In these examples, the session service 512 is configured to receive, process, and respond to the message, via a response to the session API call, as will be described further below. The response to the session API call may include an acknowledgement or negative-acknowledgement indicating whether session setup was successful and/or a portion of a stream of media packets. Additionally, in these examples, the customer interface 132A is configured to receive and render the stream of media packets from the session service 512 while the session remains active. In some examples, the media packets included in the stream may include video and/or audio data that complies with an ADOBE FLASH media packet format.

In some examples directed to half-duplex operation, the customer interface 132A renders a user interface control (e.g., a button) configured to receive user input indicating that the user wishes to speak within the session. In these examples, the customer interface 132A is configured to activate a microphone accessible to the customer interface 132A and proximal to the user (e.g., a microphone incorporated into the customer device 122), in response to selection of the user control. Moreover, in these examples, the customer interface 132A is configured to capture (e.g., via the microphone) and communicate (e.g., via the network 118), in response to selection of the user interface control, a stream of media packets (e.g., audio packets) to the session service 512. Further, in these examples, the customer interface 132A is configured to send, in response to selection of the user interface control, a control message (e.g., via a session API call) to the session service 512 requesting deactivation of a microphone of the location-based device. In these examples, the customer interface 132A is also configured to deactivate the microphone proximal to the user in response to deselection of the user interface control. Further, in these examples, the customer interface 132A is configured to send, in response to deselection of the user interface control, a control message (e.g., via a session API call) to the session service 512 requesting activation of the microphone. This configuration will be described further below with reference to FIG. 9B.

In certain examples, the customer interface 132A is also configured to receive (e.g., via a user interface control) input from a user requesting termination of the session. In some of these examples, the customer interface 132A is configured to respond to such user input by communicating, via a session API call, a message to the session service 512 that requests termination of the session. As will be described further below, in these examples, the session service 512 is configured to receive, process, and respond to the message by terminating the session.

Continuing with the example of FIG. 5, the agency interface 130A is configured to receive input from a user requesting that an interactive communication session be established between the computing device 518A and a location-based device (e.g., the image capture device 104 of FIG. 1 or the image capture device 110 of FIG. 1). In these examples, the agency interface 130A is configured to respond to such user input by querying the configuration service 510 to determine capabilities of the location-based device. For instance, in some examples, the agency interface 130A is configured to interoperate with the configuration service 510 via a configuration API exposed and implemented by the configuration service 510. In such examples, the agency interface 130A communicates, via a configuration API call, a message to the configuration service 510 that identifies the location-based device and requests configuration information regarding the capabilities of the location-based device. In these examples, the configuration service 510 is configured to receive, process, and respond to the message, via a response to the configuration API call, as will be described further below. The response may include configuration data describing capabilities of the location-based device, such as whether the location-based device is capable of supporting full-duplex sessions.

In certain examples, the agency interface 130A is configured to render an indication, via a user interface, of whether the location-based device is capable of supporting full-duplex sessions. For instance, in some examples, the agency interface 130A is configured to render, in response to reception of configuration data specifying that the location-based device is capable of full-duplex operation, a user interface control that is selectable to indicate a preference to establish a full-duplex session. In some examples, the agency interface 130A is configured to respond to user input selecting the full-duplex control by communicating a request to initiate a full-duplex session between the agency interface 130A and the camera client 138A hosted by the location-based device. For instance, in some examples, the agency interface 130A is configured to interoperate with the session service 512 via the session API. In such examples, the agency interface 130A communicates, via a session API call, a session request message to the session service 512 that identifies the location-based device and requests initiation of the full-duplex session. In certain examples, to specify a request for a full-duplex session, this session request message may include a parameter that specifies the type of the process/program (e.g., an agency interface 130) that is requesting the session.

In some examples, the session service 512 is configured to receive, process, and respond to the session request message, via a response to the session API call, as will be described further below. The response to the session API call may include an acknowledgement or negative-acknowledgement indicating whether session setup was successful and/or a portion of a stream of media packets. Additionally, in these examples, the agency interface 130A is configured to receive and render the stream of media packets from the session service 512 while the session remains active. In some examples, the media packets included in the stream may include video and/or audio data that complies with an ADOBE FLASH media packet format.

It should be noted that, in these examples, the agency interface 130A is configured to activate, in response to selection of the full-duplex control, a microphone accessible to agency interface 130A and proximal to the user (e.g., a microphone incorporated into the computing device 518A). Moreover, in these examples, the agency interface 130A is configured to capture (e.g., via the microphone) and communicate (e.g., via the network 118), in response to selection of the full-duplex control, a stream of media packets (e.g., audio packets) to the session service 512. This configuration will be described further below with reference to FIG. 9A.

In some examples, the agency interface 130A is configured to render a user interface control that is selectable to indicate a preference to establish a half-duplex session. In these examples, the agency interface 130A is configured to respond to user input selecting the control by communicating a request to initiate a half-duplex session between the agency interface 130A and the camera client 138A hosted by the location-based device. For instance, in some examples, the agency interface 130A is configured to interoperate with the session service 512 via the session API. In such examples, the agency interface 130A communicates, via a session API call, a session request message to the session service 512 that identifies the location-based device and requests initiation of the half-duplex session. In certain examples, to specify a request for a half-duplex session, this message may omit a parameter that specifies the type of the process/program that is requesting the session. Alternatively or additionally, to specify a request for a half-duplex session, this message may include a parameter that expressly specifies that half-duplex operation is requested.

It should be noted that, in these examples, the agency interface 130A may render a user interface control (e.g., a button) configured to receive user input indicating that the user wishes to speak within the session. In these examples, the agency interface 130A is configured to activate a microphone accessible to agency interface 130A and proximal to the user (e.g., a microphone incorporated into the computing device 518A), in response to selection of the user control. Moreover, in these examples, the agency interface 130A is configured to capture (e.g., via the microphone) and communicate (e.g., via the network 118), in response to selection of the user interface control, a stream of media packets (e.g., audio packets) to the session service 512. Further, in these examples, the agency interface 130A is configured to send, in response to selection of the user interface control, a control message (e.g., via a session API call) to the session service 512 requesting deactivation of a microphone of the location-based device. Further, in these examples, the agency interface 130A is configured to send, in response to deselection of the user interface control, a control message (e.g., via a session API call) to the session service 512 requesting activation of the microphone.

Regardless of the type of session (half-duplex or full-duplex) requested by the agency interface 130A, the session service 512 is configured to receive, process, and respond to the message, via a response to the session API call, as will be described further below. The response to the session API call may include an acknowledgement or negative-acknowledgement indicating whether session setup was successful and/or a portion of a stream of media packets. Additionally, in these examples, the agency interface 130A is configured to receive and render a stream of media packets from the session service 512 while the session remains active. In some examples, the media packets included in the stream may include video and/or audio data that complies with an ADOBE FLASH media packet format.

In some examples, the agency interface 130A is also configured to receive input from a user requesting termination of the session. In these examples, the agency interface 130A is configured to respond to such user input by communicating, via a session API call, a message to the session service 512 that requests termination of the session. As will be described further below, in these examples, the session service 512 is configured to receive, process, and respond to the message by terminating the session. It should be noted that other instances of the agency interfaces 130 may be configured in accordance with the configuration of the agency interface 130A described above.

Continuing with the example of FIG. 5, the session service 512 is configured to interoperate with the configuration service 510 and the support service 508 to establish communication sessions between location-based devices and computing devices that request the sessions. The computing devices that request the sessions may include the computing devices 518 and the customer device 122. The location-based devices involved in the sessions may include the image capture devices 110 and 104 of FIG. 1. In some examples, the session service 512 exposes and implements a session API to exchange messages with processes (e.g., the customer interface 132A or the agency interfaces 130) hosted by the computing devices. For instance, in some examples, the session service 512 is configured to receive one or more messages via one or more session API calls from a process (e.g., a session requester), such as the customer interface 132A or one of the agency interfaces 130, attempting to initiate a session with a location-based device. The messages may specify an identifier (e.g., a globally unique identifier) of the location-based device (e.g., the image capture device 104 of FIG. 1). In these examples, the session service 512 is further configured to, in response to reception of a message requesting initialization of a session, interoperate with the configuration service 510 (e.g., via a configuration API exposed and implemented by the configuration service 510) to identify a communication path to the location-based device. This communication path may include, for example, an identifier (e.g., IP address) of a particular instance of the support service 508 that is currently connected to the location-based device.

In some examples, the session service 512 is configured to interoperate with the identified instance of the support service 508 (e.g., via a support API exposed and implemented by the support service 508) to establish a communication session between a process hosted by the location-based device (e.g., the camera client 138A) and the session requester. In some examples, the session requester may request that the session be a full-duplex session. For instance, the session requester may include a parameter within a message communicated to the session service 512 that indicates a full-duplex session is requested, as described above. Where this is the case, the session service 512 may communicate the request message for the full-duplex session to the support service 508 via a support API call. This request message may specify that full-duplex operation is requested by including a parameter that specifies the type of the process/program (e.g., an agency interface 130) that is requesting the session. In some examples, the session requester may request that the session be a half-duplex session. For instance, the session requester may include a parameter within a message communicated to the session service 512 that indicates a half-duplex session is requested, as described above. Where this is the case, the session service 512 may communicate the request message for the half-duplex session to the support service 508 via a support API call. This request message may specify that half-duplex operation is requested by including a parameter that specifies that half-duplex operation is requested or by omitting a parameter that specifies that full-duplex operation is requested.

Regardless of the type of session (half-duplex or full-duplex) requested by the session service 512, the support service 508 is configured to receive, process, and respond to the message, via a response to the support API call, as will be described further below. The response to the support API call may include an acknowledgement or negative-acknowledgement indicating whether session setup was successful and/or a portion of a stream of media packets. In these examples, the session service 512 is configured to communicate an acknowledgement or negative-acknowledgement indicating whether session setup was successful and/or the portion of the stream of media packets to the session requester (e.g., in a response to the session API call received from the session requester).

In some examples, the session service 512 is configured to receive one or more messages via one or more session API calls from the session requester to terminate an active session with a location-based device. The messages may specify an identifier of the active session or of the location-based device. In these examples, the session service 512 is further configured to, in response to reception of a message requesting termination of a session, interoperate with the support service 508 to terminate the session. For instance, in some examples, the session service 512 communicates a message (e.g., via a support API call) to the support service 508 requesting session termination. As will be described further below, in these examples, the support service 508 is configured to receive, process, and respond to the message (e.g., via a response to the API call) by terminating the session. Examples of processes that the session service 512 is configured to execute are described further below with reference to FIGS. 6A, 6B, 9A, and 9B.

Continuing with the example of FIG. 5, the configuration service 510 is configured to interoperate with the session service 512 and the support service 508 to maintain configuration information regarding selected aspects of the system 100. For instance, in some examples, the configuration service 510 exposes and implements an API to exchange messages with the support service 508. These messages may include requests to manipulate (e.g., retrieve, store, delete, change, etc.) configuration information maintained by the configuration service 510 within one or more data stores. The configuration service 510 can respond to individual messages by executing the manipulation requested therein and communicating successful or unsuccessful completion of the manipulation via transmission of an acknowledgement or negative-acknowledgement to the support service 508. The messages processed by the configuration service 510 may specify configuration information regarding the support service 508, itself, and/or regarding location-based devices connected to the support service 508. The configuration information may include, for example, an identifier (e.g., an IP address.) of the support service 508; an identifier (e.g., a media access layer (MAC) address, serial number, etc.) of a location-based device connected to the support service 508; a security token of the location-based device; a name of the location-based device; an identifier of a customer account associated with the location-based device; a service set identifier (SSID) of a network to which the location-based device is connected; a model number of the location-based device; a version number of firmware installed on the location-based device; etc.

In some examples, the configuration service 510 is configured to interoperate with other processes (e.g., the session service 512, the support service 508, the agency interfaces 130, and the customer interface 132A) to retrieve and return configuration information upon request. For instance, in some examples, the configuration service 510 exposes and implements a configuration API to exchange messages with the other processes. These messages may include requests to retrieve configuration information maintained by the configuration service 510. The configuration service 510 can respond to individual messages by executing a retrieval query specified within the message and communicating successful or unsuccessful completion of the retrieval via transmission of a response message (e.g., within an API response) specifying the requested configuration information. The messages processed by the configuration service 510 may request configuration information regarding the support service 508, itself, and/or regarding location-based devices connected to the support service 508. Examples of processes that the configuration service 510 is configured to execute are described further below with reference to FIGS. 6A and 6B.

Continuing with the example of FIG. 5, the support service 508 is configured to provide several services that support operation of location-based devices and interoperation between the location-based devices and the surveillance service 128. For instance, in some examples, the support service 508 exposes and implements a support API to exchange messages with the camera client 138A. These messages may include requests from the camera client 138A to register a location-based device with the surveillance service 128. The support service 508 can respond to individual registration messages by attempting to authenticate the location-based device hosting the camera client 138A to the surveillance service 128 and, where authentication is successful, interoperating with the configuration service 510 to register the location-based device with the surveillance service 128. This registration may involve interoperating with the configuration service 510 to store, within one or more data stores, configuration information descriptive of, or otherwise associated with, the location-based device. This configuration information may include an identifier of the location-based device, a customer account associated with the location-based device, a security token assigned to the location-based device, etc. In some examples, the support service 508 is configured to communicate successful or unsuccessful completion of the registration process via transmission of an acknowledgement or negative-acknowledgement to the location-based device that requested registration.

In some examples, the messages handled by the support API may include requests from the camera client 138 to login to the surveillance service 128. In these examples, the support service 508 can respond to individual login messages by establishing a WAN connection with the location-based device and interoperating with the configuration service 510 to record additional configuration information regarding the WAN connection and the location-based device (e.g., capabilities of the location-based device). In at least one example, the configuration information descriptive of the location-based device may specify that the location-based device is a doorbell camera that is capable of either half-duplex or full-duplex operation. In some examples, the support service 508 is configured to communicate successful or unsuccessful completion of the login process via transmission of an acknowledgement or negative-acknowledgement to the location-based device that requested login.

In some examples, the support service 508 is configured to interoperate with session service 512 to establish, maintain, and terminate a communication session between a process hosted by the location-based device (e.g., the camera client 138A) and the session requester. For instance, in some examples, the support service 508 exposes and implements a support API to exchange messages with the session service 512. These messages may include requests to initiate or terminate a session.

In some examples, the support service 508 is configured to respond to a message requesting initiation of a session by communicating, via the support API, a message to a camera client 138A of a location-based device to start the requested session. In these examples, the camera client 138A can respond to these session start messages by activating an image sensor and microphone accessible to the camera client 138A and communicating a stream of media packets to the support service 508. The support service 508, in turn, can communicate the stream of media packets to the session service 512, thereby indicating a successful initiation of the session.

In some examples, the media stream may include packets of media acquired through the image sensor and microphone and digitized by circuitry included in the location-based device hosting the camera client 138A. While a session remains active, the support service 508 may sporadically communicate, to the camera client 138A, a stream of media packets including audio data captured by a session requester and communicated to the support service 508 by the session service 512. This audio data may encode speech received by a microphone accessible to the session requester. The camera client 138A may receive the stream of media packets, parse the packets to extract audio data, and render the audio data via a speaker controllable by the camera client 138A (e.g., a speaker included in the location-based device).

In at least some examples, the camera client 138A configures the location-based device to operate in a half-duplex mode by default. When operating in half-duplex mode, the microphone of the location-based device is deactivated by a control message originating from the session requester and/or while the speaker of the location-based device renders audio data and for a configurable timeout period (e.g., 10 seconds) thereafter. However, in examples where the location-based device has previously specified full-duplex capability within a login message, the support service 508 may request, within the session start message, that the location-based device operate in full-duplex mode. If such is the case, the camera client 138A may configure the location-based device to operate in full-duplex mode. When operating in full-duplex mode, the microphone remains active while the speaker renders audio data. In these examples, the microphone may capture audio data rendered by the speaker in addition to audio signals originating from other sources, such as a person speaking near the location-based device.

In some examples, the support service 508 is configured to respond to a message requesting termination of a session by communicating, via the support API, a message to the camera client 138A of a location-based device to terminate the requested session. In these examples, the camera client 138A can respond to these session termination messages by deactivating an image sensor and microphone accessible to the camera client 138A. Examples of processes that the support service 508 is configured to execute are described further below with reference to FIGS. 6A, 6B, 8, 9A, and 9B.

Figure 6A:
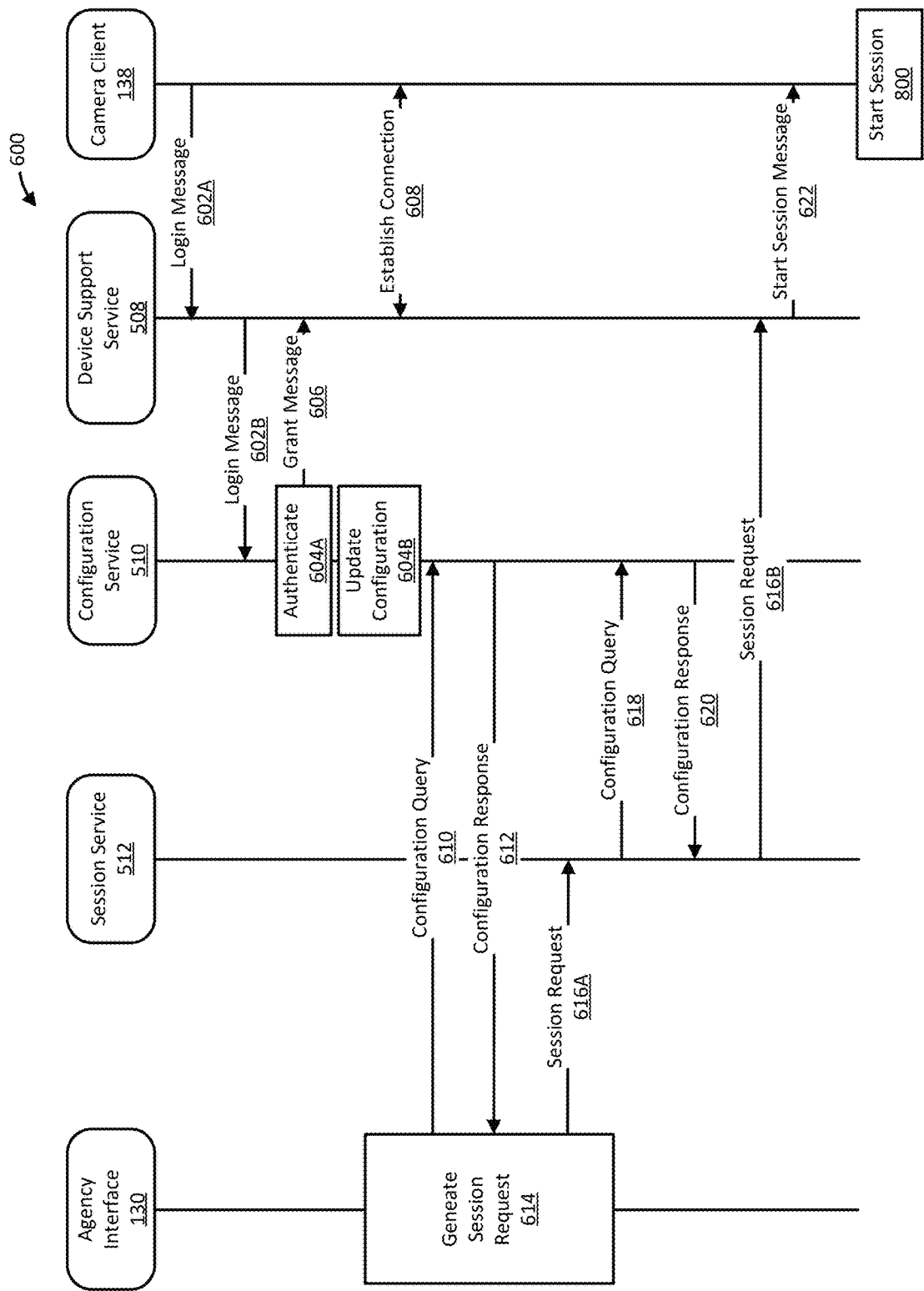
FIG. 6A is a sequence diagram of a process of initializing a half-duplex or a full-duplex session between computing devices, according to some examples described herein.

Turning now to FIG. 6A, a session administration process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., one or more of the code sets 208, 308, or 408 of FIGS. 2-4D) implemented by at least one processor (e.g., one or more of the processors 200, 300, or 400 of FIGS. 2-4D). Examples of the DCS code can include, for example, one of the camera clients 138 of FIG. 1, which is shown as camera client 138. At least a portion of the process 600 is executed by a monitoring center environment (e.g., the monitoring center environment 120 of FIG. 1) under control of an agency interface (e.g., the agency interface 130 of FIG. 1). At least a portion of the process 600 is executed by a data center environment (e.g., the data center environment 124 of FIG. 1) under control of a surveillance service (e.g., the surveillance service 128 of FIG. 1).

As shown in FIG. 6A, the process 600 starts with the camera client 138 generating a login message 602A and communicating (e.g., via one or more support API calls) the login message 602A to the support service 508. For instance, in some examples, the login message specifies capabilities of the device hosting the camera client 138. As such, the login message may include a security token and one or more parameters that specify whether the host device supports one or more protocols for conducting sessions with other devices, whether the host device supports full-duplex sessions, and/or whether the host device supports half-duplex sessions. In some examples, the camera client 138 communicates the login message via one or more support API calls, as discussed above with reference to FIG. 5.

Continuing with the process 600, the support service 508 receives and processes the login message 602A. For instance, in some examples, the processing executed by the support service 508 includes parsing the login message 602A to extract configuration information stored, or otherwise specified, therein. The processing may further include generating a login message 602B using at least a portion of the extracted configuration information and communicating (e.g., via one or more configuration API calls) the login message 602B to the configuration service 510.

Continuing with the process 600, the configuration service 510 receives and processes the login message 602B. For instance, in some examples, the processing executed by the support service 508 includes parsing the login message 602B to extract configuration information stored, or otherwise specified, therein. The processing may further include authenticating 604A the device hosting the camera client 138 using the security token specified in the extracted configuration information and, more generally, updating 604B the configuration information maintained by the configuration service 510 regarding the host device. Further, in this example, the configuration service 510 communicates (e.g., via a response to the configuration API calls) a grant message 606 to the support service 508 indicating that the host device was successfully authenticated.

Continuing with the process 600, the support service 508 receives and processes the grant message 606. For instance, in some examples, the processing executed by the support service 508 includes parsing the grant message 606 to extract authentication results stored, or otherwise specified, therein. The processing may further include interoperating 608 (e.g., via one or more support API calls) with the camera client 138 to establish a connection (e.g., a TLS connection) with the camera client 138.

Continuing with the process 600, the agency interface 130 generates 614 a session request message 616A, for example, in response to receiving input from a user requesting establishment of a session with the device hosting the camera client 138. One example of a process 700 of generating a session request is illustrated with reference to FIG. 7. With combined reference to FIGS. 6A and 7, the process 700 starts with the agency interface 130 querying 702 the configuration service 510. For instance, in some examples, the agency interface 130 generates a configuration query message 610 and communicates (e.g., via one or more configuration API calls) the message 610 to the configuration service 510. The message 610 may include an identifier of the device hosting the camera client 138 and a request for configuration information regarding capabilities of the host device, such as communication protocols supported by the host device and whether the host device is capable of operating in a full-duplex mode.

Continuing with the processes 600 and 700, the configuration service 510 receives and processes the query message 610. For instance, in some examples, the processing executed by the configuration service 510 includes parsing the query message 610 to extract a query stored, or otherwise specified, therein. The processing may further include retrieving configuration data requested in the query from a data store maintained by the configuration service 510 and generating a configuration response message 612 specifying the configuration data retrieved from the data store. The processing may further include communicating (e.g., via a response to the configuration API calls) the response message 612 to the agency interface 130.

Continuing with the processes 600 and 700, the agency interface 130 receives 704 and processes the response message 612. For instance, in some examples, the processing executed by the agency interface 130 includes parsing the response message 612 to extract configuration information stored, or otherwise specified, therein. The processing may further include determining 706 whether the extracted configuration information indicates that the device hosting the camera client 138 supports full-duplex operation. If the agency interface 130 determines that the host device is capable of full-duplex operation, the agency interface proceeds to operation 708 and sets a value of a ClientType parameter within a session message 616A to indicate that the process/program originating the session message 616A is an agency interface. If agency interface 130 determines that the host device is not capable of full-duplex operation, the agency interface proceeds to operation 710 and omits the ClientType parameter from the session message 616A or sets the ClientType parameter to a value that requests half-duplex operation.

Continuing with the processes 600 and 700, the agency interface 130 communicates 712 (e.g., via a session API call) the session message 616A to the session service 512. The session message 616A may include, or omit, the ClientType parameter and an identifier of the device hosting the camera client 138, among other information. After completion of the operation 712, the process 700 may end.

Continuing with the process 600, the session service 512 receives and processes the session message 616A. For instance, in some examples, the processing executed by the session service 512 includes parsing the session message 616A to extract an identifier of the device hosting the camera client 138 and the ClientType parameter, where the same is present. The processing may further include generating a configuration query message 618 and communicating (e.g., via one or more configuration API calls) the message 618 to the configuration service 510. The message 618 may include an identifier of the host device and request an identifier (e.g., an IP address, uniform resource locator, etc.) of an instance of the support service 508 in contact with the host device.

Continuing with the process 600, the configuration service 510 receives and processes the query message 618. For instance, in some examples, the processing executed by the configuration service 510 includes parsing the query message 618 to extract a query stored, or otherwise specified, therein. The processing may further include retrieving configuration data requested in the query from a data store maintained by the configuration service 510 and generating a configuration response message 620 specifying the configuration data retrieved from the data store. The processing may further include communicating (e.g., via a response to the configuration API calls) the response message 620 to the session service 512.

Continuing with the process 600, the session service 512 receives and processes the response message 620. For instance, in some examples, the processing executed by the session service 512 includes parsing the response message 620 to extract configuration information stored, or otherwise specified, therein. This extracted configuration information may include an identifier of the support service 508 that is connected with the camera client 138. The processing may further include generating a session request message 616B based on the session message 616A. The session message 616B may specify a request to initiate a session between the agency interface 130 and the camera client 138. The session message 616B may include an identifier of the device hosting the camera client 138 and a value of a ClientType parameter. The processing may further include communicating (e.g., via one or more support API calls) the session message 616B to the support service 508 identified in the extracted configuration information.

Continuing with the process 600, the support service 508 receives and processes the session message 616B. For instance, in some examples, the processing executed by the support service 508 includes parsing the session message 616B to extract an identifier of the device hosting the camera client 138 and a value of the ClientType parameter stored, or otherwise specified, therein. The processing may further include generating a start session message 622 based on the session message 616B. The start message 622 may specify a request to initiate a session between the agency interface 130 and the camera client 138. The start message 622 may include a value of a ClientType parameter. The processing may further include communicating (e.g., via one or more support API calls) the start message 622 to the camera client 138 executing on the host device.

Continuing with the process 600, the camera client 138 processes the start message 622. One example of a process 800 that the camera client 138 can execute to process the start message is illustrated with reference to FIG. 8. With combined reference to FIGS. 6A and 8, the process 800 starts with the camera client 138 receiving 802 the start message 622. For instance, in one example, the camera client 138 receives the start message 622 via a support API call from the support service 508. Next, the camera client 138 parses 804 the start message 622 to extract a value of the ClientType parameter, where such a value is present.

Continuing with the process 800, the camera client 138 determines 806 whether the value of the ClientType parameter indicates that the type of process/program requesting the session is an agency interface (e.g., the agency interface 130). If the camera client 138 determines that the value of the ClientType parameter indicates the type of process/program requesting the session is an agency interface, the camera client 138 proceeds to operation 808 and initiates a full-duplex session. If the camera client 138 determines that no value is present for the ClientType parameter or that the value does not indicate the type of process/program requesting the session is an agency interface, the camera client 138 proceeds to operation 810 and initiates a half-duplex session. After either a half-duplex or full-duplex session is initiated, the process 800 may end. Both full-duplex and half-duplex sessions are described further below with reference to FIGS. 9A and 9B.

Figure 6B:
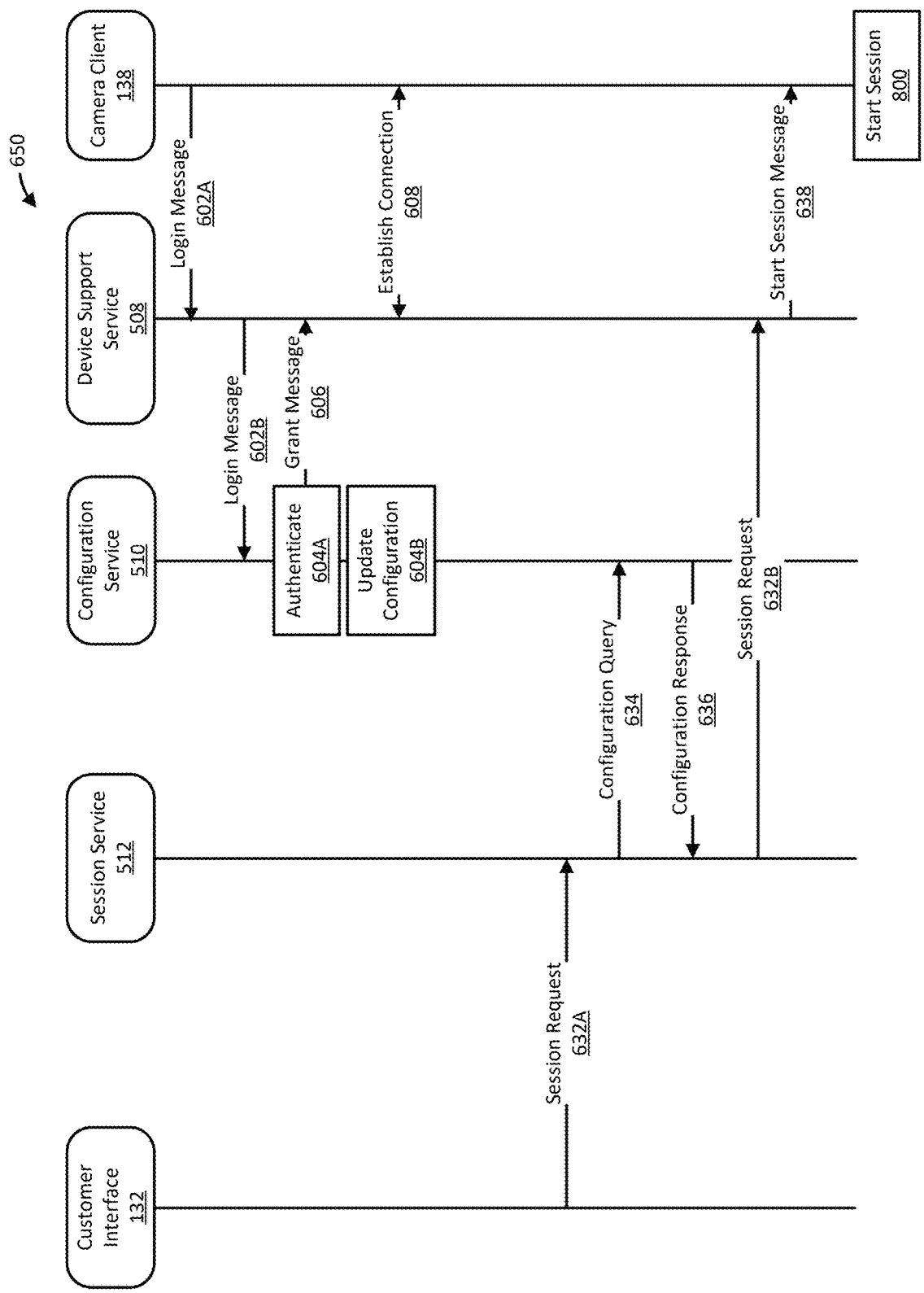
FIG. 6B is a sequence diagram of a process of initializing a half-duplex session between computing devices, according to some examples described herein.
Figure 7:
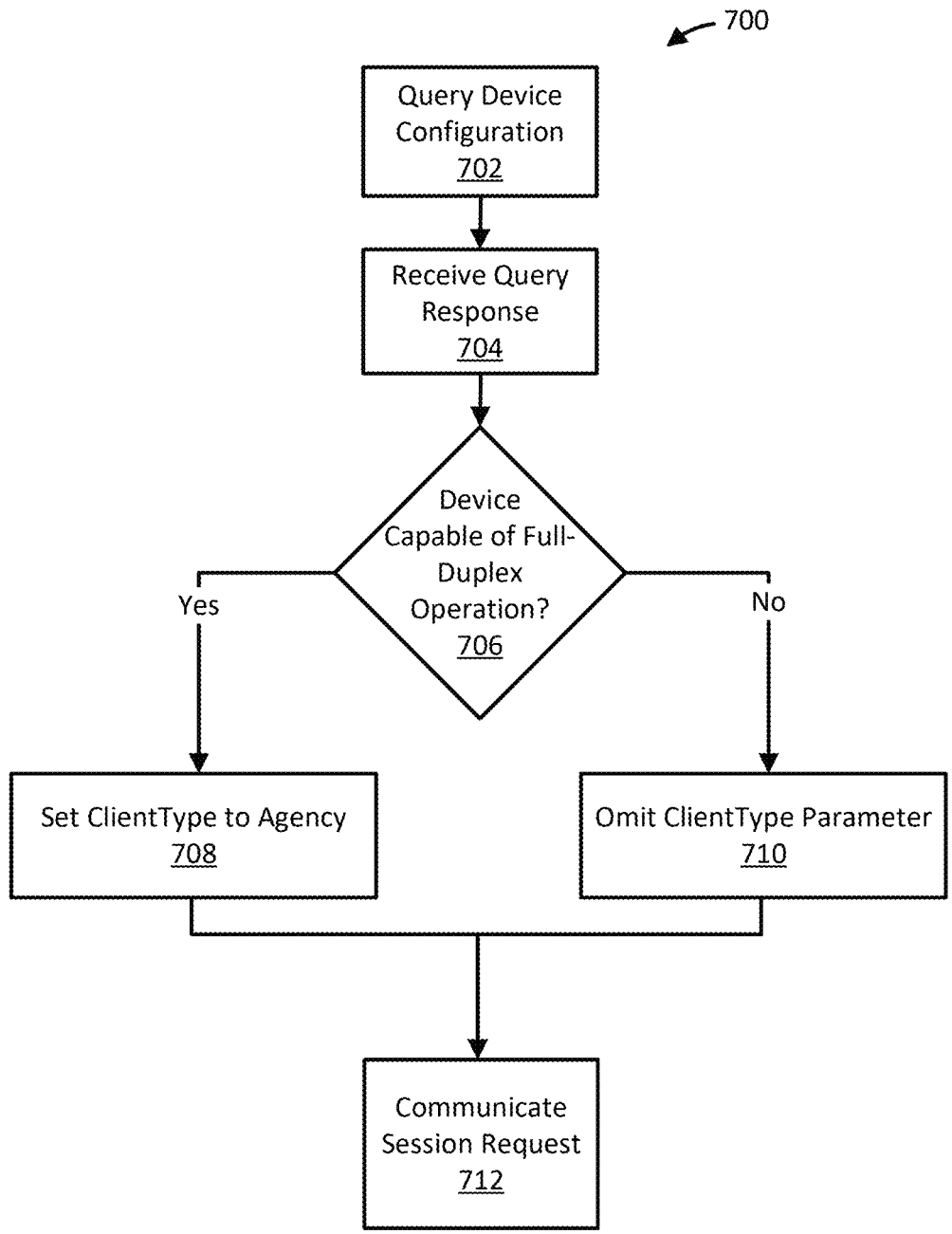
FIG. 7 is a flow diagram illustrating a process of generating a session request, according to some examples described herein.
Figure 8:
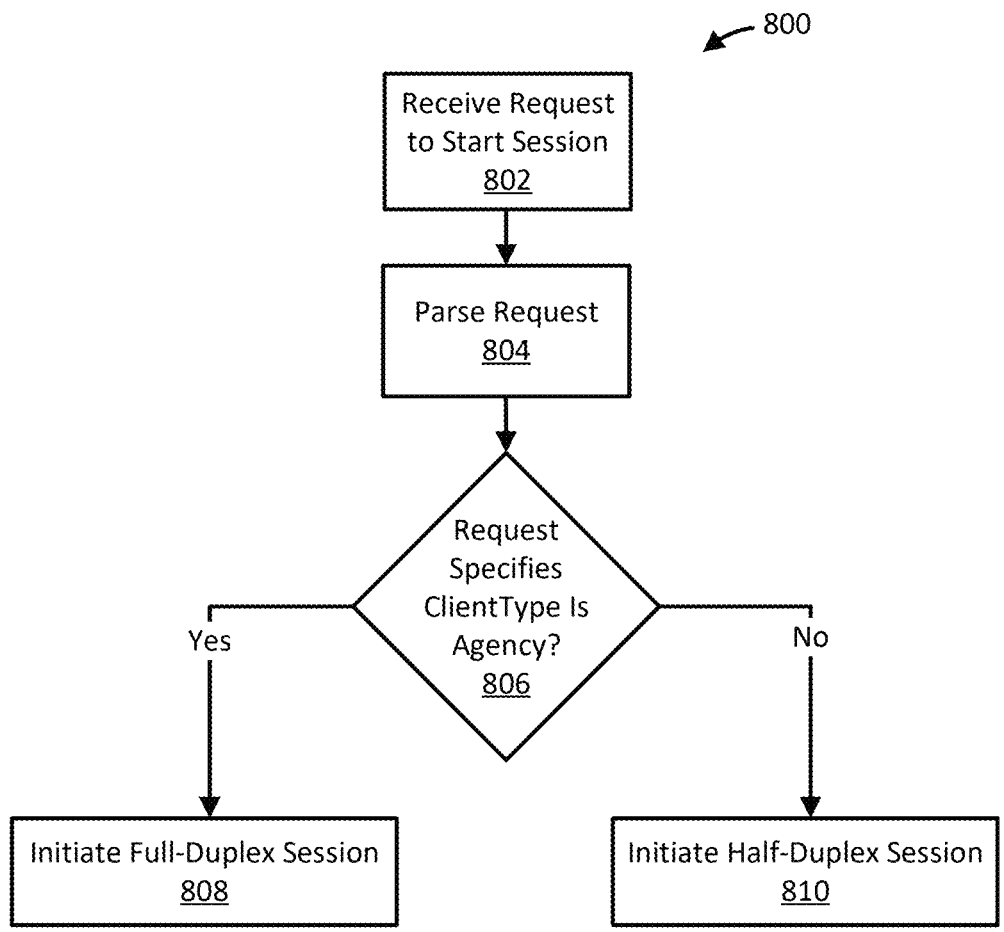
FIG. 8 is a flow diagram illustrating a process of starting a session, according to some examples described herein.

Turning now to FIG. 6B, a session administration process 650 is illustrated as a sequence diagram. The process 650 can be executed, in some examples, by a security system (e.g., the security system 100 of FIG. 1). More specifically, in some examples, at least a portion of the process 650 is executed by the location-based devices under the control of device control system (DCS) code (e.g., one or more of the code sets 208, 308, or 408 of FIGS. 2-4D) implemented by at least one processor (e.g., one or more of the processors 200, 300, or 400 of FIGS. 2-4D). Examples of the DCS code can include, for example, a camera client (e.g., one of the camera clients 138 of FIG. 1). At least a portion of the process 650 is executed by a data center environment (e.g., the data center environment 124 of FIG. 1) under control of a surveillance service (e.g., the surveillance service 128 of FIG. 1). At least a portion of the process 650 is executed by a customer device (e.g., the customer device 122 of FIG. 1) under control of a customer interface (e.g., customer interface 132 of FIG. 1).

As shown in FIG. 6B, the process 650 includes operations 604A, 604B, and 608 executed by the camera client 138, the support service 508, and the configuration service 510 described above with reference to FIG. 6A. The process 650 further includes operations involving the login message 602A, the login message 602B, and the grant message 606 described above with reference to FIG. 6A.

Further, as shown in FIG. 6B, the process 650 continues with the customer interface 132 generating a session request message 632A, for example, in response to receiving input from a user requesting establishment of a session with the device hosting the camera client 138. For instance, in some examples, the customer interface 132 allocates a portion of memory to hold the session message 632A and populates the allocated memory with an identifier of the host device, among other data. For instance, in some examples, the customer interface 132 omits a ClientType parameter from the session message 632A, or sets the ClientType parameter to a value that indicates the requesting process is of a customer interface type, so that the requested session will be conducted in half-duplex mode. Next, the customer interface 132 communicates (e.g., via one or more session API calls) the session message 632A to the session service 512.

Continuing with the process 650, the session service 512 receives and processes the session message 632A. For instance, in some examples, the processing executed by the session service 512 includes parsing the session message 632A to extract an identifier of the device hosting the camera client 138 and the ClientType parameter, where the same is present. The processing may further include generating a configuration query message 634 and communicating (e.g., via one or more configuration API calls) the query message 634 to the configuration service 510. The query message 634 may include an identifier of the host device and request an identifier (e.g., an IP address, uniform resource locator, etc.) of an instance of the support service 508 in contact with the host device.

Continuing with the process 650, the configuration service 510 receives and processes the query message 634. For instance, in some examples, the processing executed by the configuration service 510 includes parsing the query message 634 to extract a query stored, or otherwise specified, therein. The processing may further include retrieving configuration data requested in the query from a data store maintained by the configuration service 510 and generating a configuration response message 636 specifying the configuration data retrieved from the data store. The processing may further include communicating (e.g., via a response to the configuration API calls) the response message 636 to the session service 512.

Continuing with the process 650, the session service 512 receives and processes the response message 636. For instance, in some examples, the processing executed by the session service 512 includes parsing the response message 636 to extract configuration information stored, or otherwise specified, therein. This extracted configuration information may include an identifier of the support service 508 that is connected with the camera client 138. The processing may further include generating a session request message 632B based on the session message 632A. The session message 632B may specify a request to initiate a session between the customer interface 132 and the camera client 138. The session message 632B may include an identifier of the device hosting the camera client 138 and a value of a ClientType parameter. The processing may further include communicating (e.g., via one or more support API calls) the session message 632B to the support service 508 identified in the extracted configuration information.

Continuing with the process 650, the support service 508 receives and processes the session message 632B. For instance, in some examples, the processing executed by the support service 508 includes parsing the session message 632B to extract an identifier of the device hosting the camera client 138 and a value of the ClientType parameter stored, or otherwise specified, therein. The processing may further include generating a start session message 638 based on the session message 632B. The start message 638 may specify a request to initiate a session between the customer interface 132 and the camera client 138. The start message 638 may include a value of a ClientType parameter. The processing may further include communicating (e.g., via one or more support API calls) the start message 638 to the camera client 138 executing on the host device.

Continuing with the process 650, the camera client 138 processes the start message 638. One example of a process 800 that the camera client 138 can execute to process the start message is illustrated with reference to FIG. 8 and described above.

Figure 9A:
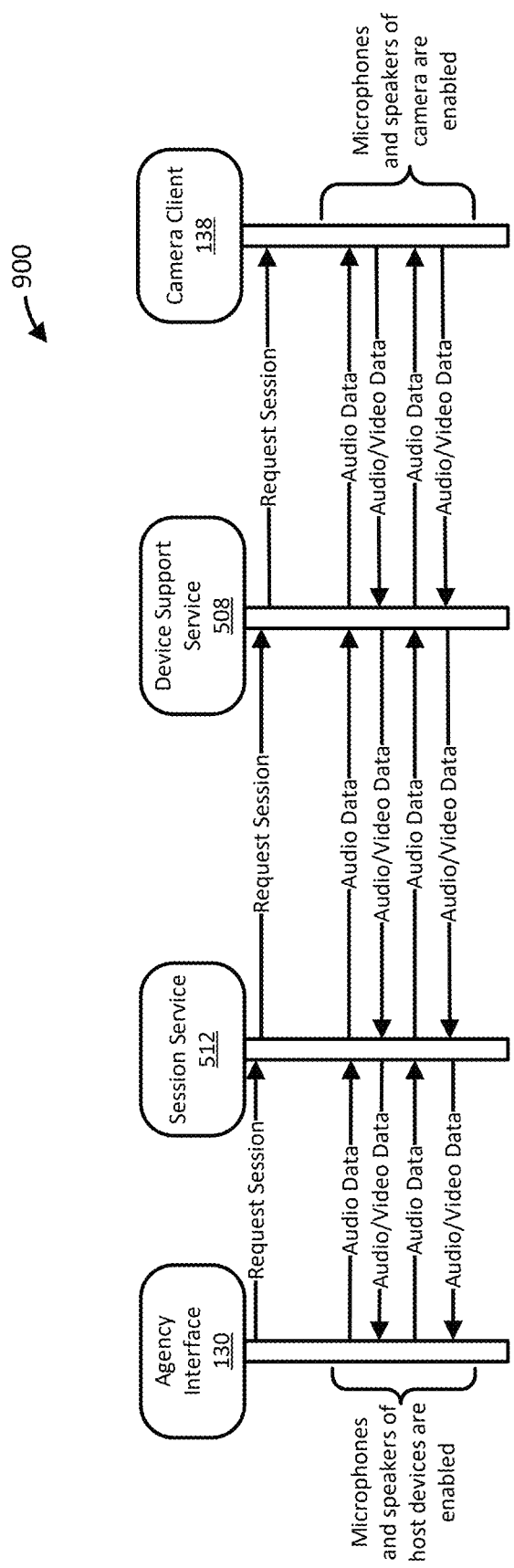
FIG. 9A is a sequence diagram illustrating a full-duplex session, according to some examples described herein.

Turning now to FIG. 9A, a full-duplex session 900 is illustrated schematically. The session 900 can be executed, in some examples, by a system (e.g. the security system 100 of FIG. 1). The session 900 may start in response to a user of an agency interface 130 requesting a session with the camera client 138. This request may be passed, or otherwise communicated, through a session service 512 and/or a device support service 508 as described above. When the illustrated system is operating in a full-duplex mode, both the microphone and the speaker controlled by the agency interface 130 and the microphone and the speaker controlled by camera client 138 may be kept continuously enabled for some or all of the session. In some cases, the system executing the session 900 may also be capable of executing a half-duplex session 950. In those cases, the system may select the session 900 manually or autonomously. When the security system selects the full-duplex session 900 autonomously, it may do so in response to the presence or absence of one or more established conditions, such as the presence of the agency interface 130 in the session. It should be noted that, when working within the full-duplex session 900, users may not need to interact with their respective devices to control reception or rendering of audio data or video data. In some examples, once full-duplex mode is enabled, the users' interactions may be limited to closing the session. It should also be noted that, in some examples, the agency interface 130 implements an echo cancellation process prior to rendering audio data to the user of the agency interface 130.

Figure 9B:
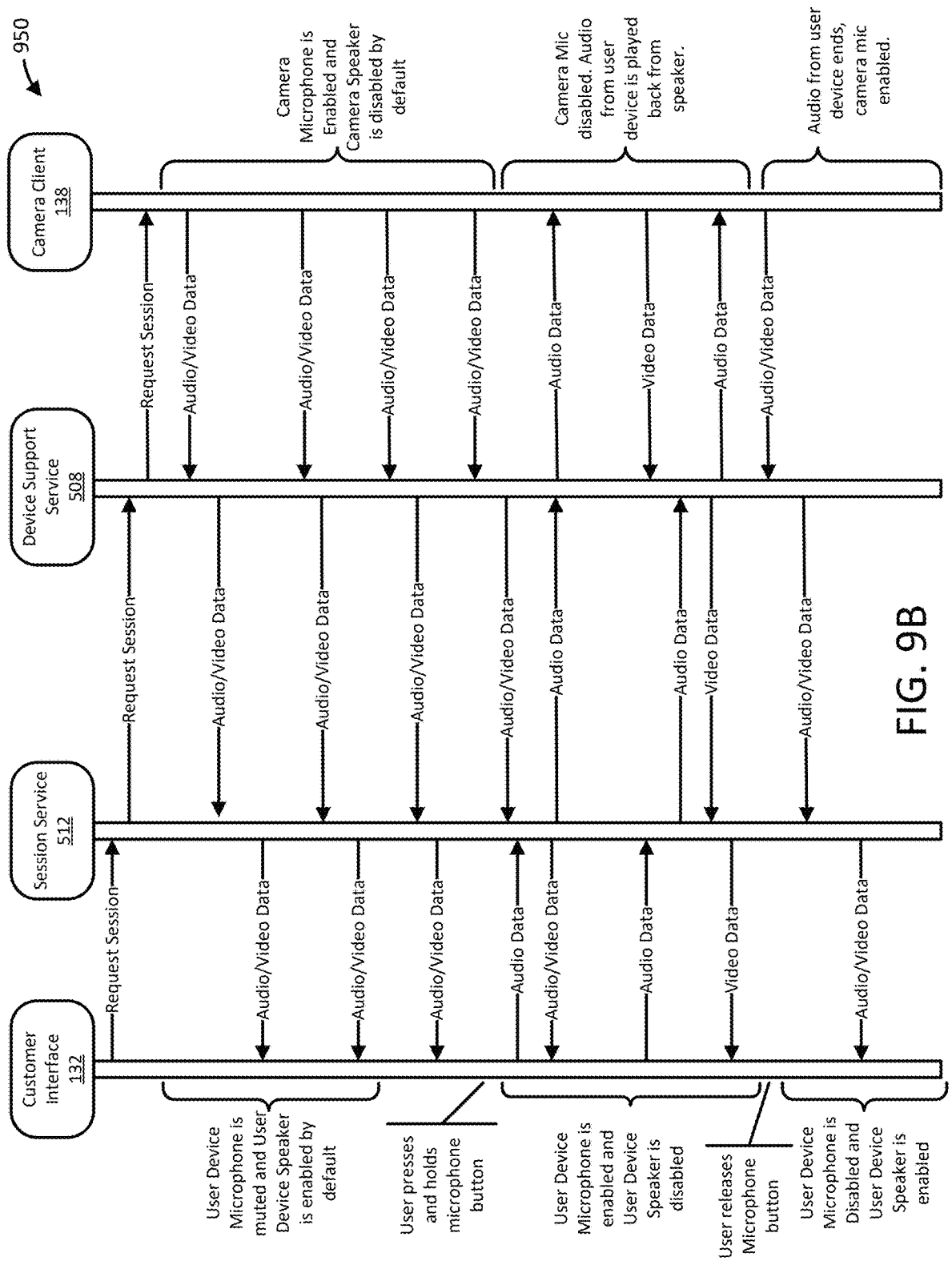
FIG. 9B is a sequence diagram illustrating a half-duplex session, according to some examples described herein.

Turning now to FIG. 9B, a half-duplex session 950 is illustrated schematically. The session 950 is characterized by its responsiveness to the inputs of individual users, who may be at the customer interface 132 and the camera client 138. The session 950 may start in response to a customer, using the customer interface 132, requesting a session. The session request may be routed, or otherwise communicated, through the session service 512 and/or a device support service 508 on its way to the camera client 138. When the system is operating in half-duplex mode, a first microphone under control of the camera client 138 may be enabled, while a second microphone under control of the customer interface 132 may be disabled, or vice-versa. In examples where the first microphone starts enabled, the customer interface 132 may include a feature, such as a button (e.g., a microphone switch), that causes the customer interface 132 to enable the second microphone and the camera client 138 to disable the first microphone. In some instances, this feature may be held to enable the second microphone, and released to revert the system to its default state (e.g., with the first microphone enabled and the second microphone disabled). This sequence of activity is illustrated in FIG. 9B. In some other instances, the feature may operate as a toggle, which enables the second microphone and disables the first microphone until the toggle is reversed. In some instances, the microphones may also switch when they do not detect audio data from the enabled microphone for a period of time. The period of time may be a second, two seconds, three seconds, or longer. In some cases where the microphones may switch, the camera client 138 may control an indicator element incorporated into its host device, such as an LED (e.g., the light 462 of FIG. 4D), to indicate to a user whether the camera client 138 microphone is enabled or disabled. For instance, the LED may blink or be pulsed while the first microphone is active and may continuously illuminate in a steady state while the first microphone is disabled.

In some examples, at all stages, when the system is operating in the half-duplex session 950, the status of the second microphone and the first microphone may be opposite, i.e. when one microphone is enabled, the other microphone is disabled. When either the first microphone or the second microphone is disabled, the corresponding device's speaker may be enabled to render audio data gathered by the other microphone.

In some cases, when the session is operating in the half-duplex session 950 the session's operation may change to the full-duplex session 900. The session's operation may change in response to an input, such as a selection made by a user using the customer interface 132, a selection made by a user using the camera client 138, or in response to a change in conditions regarding the session. Such a change may include an agency interface 130 joining the session. In this situation, the system may autonomously begin operating in a full-duplex session (e.g., the full-duplex session 900 described above). Likewise, a change in the session conditions may include an agency interface 130 leaving the session. In this situation, the system may autonomously revert to the half-duplex session 950.

It should be noted that, as shown in FIGS. 9A and 9B, the session requester (e.g., the agency interface 130 or the customer interface 132) transmits audio data and receives both audio data and video data. Further, in these examples, the camera client 138 receives audio data and transmits both audio data and video data. This particular arrangement is specific to this example. Other arrangements in which one or more devices transmit either audio data, video data, or both audio data and video data will be apparent in view of this disclosure. It should also be noted that, in some examples disclosed herein, an image sensor under control of the camera client 138 may or may not be disabled along with a microphone under control of the camera client 138. As such, video data may continue to be obtained and communicated by camera client 138 regardless of whether a controlled microphone is enabled or disabled.

Figure 10:
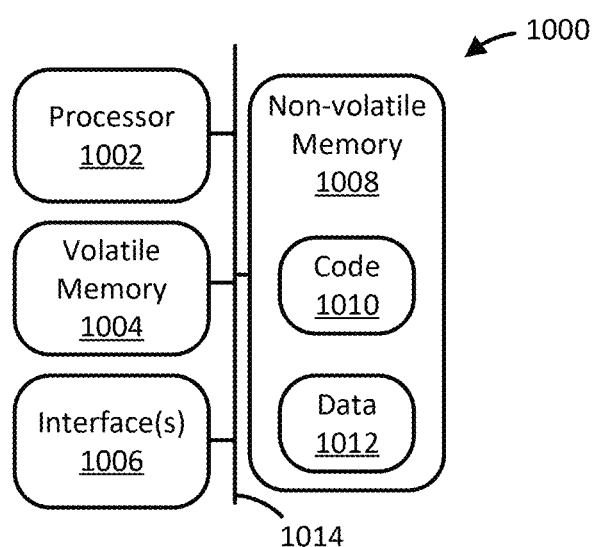
FIG. 10 is a schematic diagram of a computing device, according to some examples described herein.

Turning now to FIG. 10, a computing device 1000 is illustrated schematically. As shown in FIG. 10, the computing device includes at least one processor 1002, volatile memory 1004, one or more interfaces 1006, non-volatile memory 1008, and an interconnection mechanism 1014. The non-volatile memory 1008 includes code 1010 and at least one data store 1012.

In some examples, the non-volatile (non-transitory) memory 1008 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1010 stored in the non-volatile memory can include an operating system and one or more applications or programs that are configured to execute under the operating system. Alternatively or additionally, the code 1010 can include specialized firmware and embedded software that is executable without dependence upon a commercially available operating system. Regardless, execution of the code 1010 can result in manipulated data that may be stored in the data store 1012 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing with the example of FIG. 10, the processor 1002 can be one or more programmable processors to execute one or more executable instructions, such as a computer program specified by the code 1010, to control the operations of the computing device 1000. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1004) and executed by the circuitry. In some examples, the processor 1002 is a digital processor, but the processor 1002 can be analog, digital, or mixed. As such, the processor 1002 can execute the function, operation, or sequence of operations using digital values and/or using analog signals. In some examples, the processor 1002 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1002 that are multicore can provide functionality for parallel, simultaneous execution of instructions or for parallel, simultaneous execution of one instruction on more than one piece of data.

Continuing with the example of FIG. 10, prior to execution of the code 1010 the processor 1002 can copy the code 1010 from the non-volatile memory 1008 to the volatile memory 1004. In some examples, the volatile memory 1004 includes one or more static or dynamic random access memory (RAM) chips and/or cache memory (e.g. memory disposed on a silicon die of the processor 1002). Volatile memory 1004 can offer a faster response time than a main memory, such as the non-volatile memory 1008.

Through execution of the code 1010, the processor 1002 can control operation of the interfaces 1006. The interfaces 1006 can include network interfaces. These network interfaces can include one or more physical interfaces (e.g., a radio, an ethernet port, a USB port, etc.) and a software stack including drivers and/or other code 1010 that is configured to communicate with the one or more physical interfaces to support one or more LAN, PAN, and/or WAN standard communication protocols. The communication protocols can include, for example, TCP/IP and UDP among others. As such, the network interfaces enable the computing device 1000 to access and communicate with other computing devices via a computer network.

The interfaces 1006 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1010 that is configured to communicate with the user input and/or output devices. As such, the user interfaces enable the computing device 1000 to interact with users to receive input and/or render output. This rendered output can include, for instance, one or more GUIs including one or more controls configured to display output and/or receive input. The input can specify values to be stored in the data store 1012. The output can indicate values stored in the data store 1012.

Continuing with the example of FIG. 10, the various features of the computing device 1000 described above can communicate with one another via the interconnection mechanism 1014. In some examples, the interconnection mechanism 1014 includes a communications bus.

Various innovative concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Descriptions of additional examples follow. Other variations will be apparent in light of this disclosure.

Example 1 is directed to a method. The method includes operating, by a device that includes a microphone, the microphone in a half-duplex mode; receiving, by the device, a message to initiate a session with another device, the message including a parameter; parsing, by the device, the message to identify a mode of operation of the microphone based on the parameter; and adjusting, by the device, the microphone to operate in a full-duplex mode based on the mode of operation identified based on the parameter.

Example 2 incorporates the subject matter of Example 1 and further includes receiving audio from the another device, wherein operating the microphone in the half-duplex mode includes inactivating the microphone prior to rendering the audio via a speaker incorporated in the device.

Example 3 incorporates the subject matter of Example 2, wherein operating the microphone in the half-duplex mode includes activating the microphone after a threshold period of time has elapsed since the audio was received from the another device.

Example 4 incorporates the subject matter of either Example 2 or Example 3, wherein receiving the message to initiate the session includes receiving a parameter indicating an agency interface generated the message.

Example 5 incorporates the subject matter of any of examples 1 through 4, wherein operating the microphone in the full-duplex mode includes activating the microphone prior to rendering audio via a speaker incorporated in the device.

Example 6 incorporates the subject matter of Example 5 and further includes receiving audio from the another device; rendering the audio via the speaker; and capturing the audio via the microphone.

Example 7 incorporates the subject matter of Example 6 and further includes communicating, by the device to the another device, the audio captured by the microphone.

Example 8 incorporates the subject matter of any of Examples 1 through 7 and further includes communicating, by the device to the another device, image data captured by an image sensor incorporated in the device.

Example 9 incorporates the subject matter of Example 8, wherein communicating the image data includes communicating the image data from a camera.

Example 10 is directed to a system. The system includes a memory; a microphone; a network interface; and at least one processor coupled with the memory, the microphone, and the network interface. The at least one processor being configured to operate the microphone in a half-duplex mode; receive, via the network interface, a message to initiate a session with a device, the message including a parameter; parse the message to identify a mode of operation of the microphone based on the parameter; and adjust the microphone to operate in a full-duplex mode based on the mode of operation identified based on the parameter.

Example 11 incorporates the subject matter of example 10, wherein: the at least one processor is further configured to receive audio from the device; and render the audio via a speaker incorporated in the system; and to operate the microphone in the half-duplex mode includes to inactivate the microphone prior to rendering the audio.

Example 12 incorporates the subject matter of Example 11, wherein to operate the microphone in the half-duplex mode includes to activate the microphone after a threshold period of time has elapsed since the audio was received from the device.

Example 13 incorporates the subject matter of either Example 11 or Example 12, wherein to receive the message to initiate the session includes to receive a parameter indicating an agency interface generated the message.

Example 14 incorporates the subject matter of any of Examples 10 through 13, wherein to operate the microphone in the full-duplex mode includes to activate the microphone prior to rendering audio via a speaker incorporated in the system.

Example 15 incorporates the subject matter of Example 14, wherein the at least one processor is further configured to: receive audio from the device; render the audio via the speaker; and capture the audio via the microphone.

Example 16 incorporates the subject matter of Example 15, wherein the at least one processor is further configured to communicate, to the device, the audio captured by the microphone.

Example 17 incorporates the subject matter of any of Examples 10 through 16, wherein the at least one processor is further configured to communicate, to the device, image data captured by an image sensor incorporated in the system.

Example 18 incorporates the subject matter of Example 17, wherein the system is a camera.

Example 19 is directed to a method including operating, by a device that includes a microphone, the microphone in a full-duplex mode; receiving, by the device, a message to initiate a session with another device, the message omitting a parameter; identify a mode of operation of the microphone based on omission of the parameter; and operating, by the device, the microphone in a half-duplex mode based on the omission of the parameter.

Example 20 incorporates the subject matter of Example 19 and further includes receiving audio from the another device, wherein operating the microphone in the full-duplex mode includes activating the microphone prior to rendering the audio via a speaker incorporated in the device.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

The invention claimed is:

1. A method comprising:
    receiving, by a device that includes a microphone, audio;
    operating the microphone in a half-duplex mode, wherein operating the microphone in the half-duplex mode includes (a) inactivating the microphone before rendering the audio via a speaker incorporated in the device, and (b) activating the microphone after a threshold period of time has elapsed since the audio was received;
    receiving, by the device, a message to initiate a session with another device, the message including a parameter;
    parsing, by the device, the message to identify a mode of operation of the microphone based on the parameter; and adjusting, by the device, the microphone to operate in a full-duplex mode based on the mode of operation identified based on the parameter.

2. The method of claim 1, wherein receiving the message to initiate the session includes receiving a parameter indicating an agency interface generated the message.

3. The method of claim 1, wherein the audio is first audio and wherein operating the microphone in the full-duplex mode includes activating the microphone prior to rendering second audio via the speaker.

4. The method of claim 3, further comprising:
receiving the second audio from the another device;
rendering the second audio via the speaker; and
capturing the second audio via the microphone.

5. The method of claim 4, further comprising communicating, by the device to the another device, the second audio captured by the microphone.

6. The method of claim 1, further comprising communicating, by the device to the another device, image data captured by an image sensor incorporated in the device.

7. The method of claim 6, wherein communicating the image data includes communicating the image data from a camera.

8. A system comprising:
a memory;
a microphone;
a speaker;
a network interface; and
at least one processor coupled with the memory, the microphone, and the network interface, the at least one processor being configured to:
receive audio;
operate the microphone in a half-duplex mode, wherein operating the microphone in the half-duplex mode includes (a) inactivating the microphone before rendering the audio via the speaker, and (b) activating the microphone after a threshold period of time has elapsed since the audio was received;
receive, via the network interface, a message to initiate a session with a device, the message including a parameter;
parse the message to identify a mode of operation of the microphone based on the parameter; and
adjust the microphone to operate in a full-duplex mode based on the mode of operation identified based on the parameter.

9. The system of claim 8, wherein to receive the message to initiate the session includes to receive a parameter indicating an agency interface generated the message.

10. The system of claim 8, wherein the audio is first audio and wherein to operate the microphone in the full-duplex mode includes to activate the microphone prior to rendering second audio via the speaker.

11. The system of claim 10, wherein the at least one processor is further configured to:
receive the second audio from the device;
render the second audio via the speaker; and
capture the second audio via the microphone.

12. The system of claim 11, wherein the at least one processor is further configured to communicate, to the device, the second audio captured by the microphone.

13. The system of claim 8, wherein the at least one processor is further configured to communicate, to the device, image data captured by an image sensor incorporated in the system.

14. The system of claim 13, wherein the system is a camera.

15. A method comprising:
operating, by a device that includes a microphone, the microphone in a full-duplex mode;
receiving, by the device, a message to initiate a session with another device, the message omitting a parameter;
identify a mode of operation of the microphone based on omission of the parameter; and
operating, by the device, the microphone in a half-duplex mode based on the omission of the parameter.

16. The method of claim 15, further comprising receiving audio from the another device, wherein operating the microphone in the full-duplex mode includes activating the microphone prior to rendering the audio via a speaker incorporated in the device.

17. The method of claim 15, further comprising receiving audio from the another device, wherein operating the microphone in the half-duplex mode includes inactivating the microphone before rendering the audio via a speaker incorporated in the device.

18. The method of claim 15, further comprising receiving audio from the another device, wherein operating the microphone in the half-duplex mode includes:
rendering the audio via a speaker incorporated in the device; and
activating the microphone after a threshold period of time has elapsed since the audio was rendered via the speaker.

19. The method of claim 15, wherein receiving the message to initiate the session includes receiving a parameter indicating that a customer interface generated the message.

20. The method of claim 15, further comprising communicating, by the device to the another device, image data captured by an image sensor incorporated in the device.

* * * * *